US008663533B2

(12) United States Patent
Swanson et al.

(10) Patent No.: US 8,663,533 B2
(45) Date of Patent: Mar. 4, 2014

(54) METHOD OF USING PRINT HEAD ASSEMBLY IN FUSED DEPOSITION MODELING SYSTEM

(75) Inventors: William J. Swanson, St. Paul, MN (US); J. Samuel Batchelder, Somers, NY (US); Kevin C. Johnson, Minneapolis, MN (US)

(73) Assignee: Stratasys, Inc., Eden Prairie, MN (US)

( * ) Notice: Subject to any disclaimer, the term of this patent is extended or adjusted under 35 U.S.C. 154(b) by 215 days.

(21) Appl. No.: 12/976,152

(22) Filed: Dec. 22, 2010

(65) Prior Publication Data
US 2012/0164330 A1    Jun. 28, 2012

(51) Int. Cl.
*B05D 1/36* (2006.01)
(52) U.S. Cl.
USPC .......................................................... 264/308
(58) Field of Classification Search
USPC .......................................................... 264/308
See application file for complete search history.

(56) References Cited

U.S. PATENT DOCUMENTS

| | | | |
|---|---|---|---|
| 4,479,347 A | 10/1984 | Larsen et al. |
| 4,937,593 A | 6/1990 | Prats |
| 5,121,329 A | 6/1992 | Crump |
| 5,303,141 A | 4/1994 | Batchelder et al. |
| 5,312,224 A | 5/1994 | Batchelder et al. |
| 5,340,433 A | 8/1994 | Crump |
| 5,426,722 A | 6/1995 | Batchelder |
| 5,503,785 A | 4/1996 | Crump et al. |
| 5,653,925 A | 8/1997 | Batchelder |
| 5,738,817 A | 4/1998 | Danforth et al. |
| 5,764,521 A | 6/1998 | Batchelder et al. |
| 5,866,058 A | 2/1999 | Batchelder et al. |
| 5,939,008 A | 8/1999 | Comb et al. |
| 5,968,561 A | 10/1999 | Batchelder et al. |
| 5,975,688 A | 11/1999 | Kanaya et al. |
| 6,004,124 A | 12/1999 | Swanson et al. |
| 6,022,207 A | 2/2000 | Dahlin et al. |
| 6,028,410 A | 2/2000 | Leavitt et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,129,872 A | 10/2000 | Jang |
| 6,137,508 A | 10/2000 | Gaarder |
| 6,165,406 A | 12/2000 | Jang et al. |
| 6,227,643 B1 | 5/2001 | Purcell et al. |
| 6,228,923 B1 | 5/2001 | Lombardi et al. |
| 6,250,735 B1 | 6/2001 | Kaneko et al. |
| 6,547,995 B1 | 4/2003 | Comb |

(Continued)

FOREIGN PATENT DOCUMENTS

WO    WO-2009/088995 A1    7/2009

OTHER PUBLICATIONS

U.S. Appl. No. 12/841,341, filed Jul. 22, 2010, entitled "Multiple-Zone Liquefier Assembly for Extrusion-Based Additive Manufacturing Systems", pp. 1-21.

(Continued)

*Primary Examiner* — Larry Thrower
*Assistant Examiner* — Xue Liu
(74) *Attorney, Agent, or Firm* — Brian R. Morrison; Westman, Champlin & Koehler, P.A.

(57) ABSTRACT

A method of using a print head assembly that includes a print head carriage and multiple, replaceable print heads that are configured to be removably retained in receptacles of the print head carriage.

20 Claims, 21 Drawing Sheets

(56) References Cited

U.S. PATENT DOCUMENTS

| | | |
|---|---|---|
| 6,629,011 B1 | 9/2003 | Calderon et al. |
| 6,645,412 B2 | 11/2003 | Priedeman, Jr. |
| 6,685,866 B2 | 2/2004 | Swanson et al. |
| 6,722,872 B1 | 4/2004 | Swanson et al. |
| 6,749,414 B1 | 6/2004 | Hanson et al. |
| 6,776,602 B2 | 8/2004 | Swanson et al. |
| 6,790,403 B1 | 9/2004 | Priedeman, Jr. et al. |
| 6,814,907 B1 | 11/2004 | Comb |
| 6,840,609 B2 | 1/2005 | Lo et al. |
| 6,866,807 B2 | 3/2005 | Comb et al. |
| 6,869,559 B2 | 3/2005 | Hopkins |
| 6,923,634 B2 | 8/2005 | Swanson et al. |
| 6,998,087 B1 | 2/2006 | Hanson et al. |
| 7,122,246 B2 | 10/2006 | Comb et al. |
| 7,169,337 B2 | 1/2007 | Swanson et al. |
| 7,172,715 B2 | 2/2007 | Swanson et al. |
| 7,297,304 B2 | 11/2007 | Swanson et al. |
| 7,314,591 B2 | 1/2008 | Priedeman, Jr. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 2004/0004653 A1 | 1/2004 | Pryor et al. |
| 2005/0173838 A1 | 8/2005 | Priedeman et al. |
| 2005/0280678 A1 | 12/2005 | Bibl et al. |
| 2006/0077224 A1 | 4/2006 | Clarke et al. |
| 2006/0134328 A1 | 6/2006 | Jia et al. |
| 2007/0228590 A1 | 10/2007 | LaBossiere et al. |
| 2007/0228592 A1 | 10/2007 | Dunn et al. |
| 2008/0036834 A1 | 2/2008 | Usui et al. |
| 2008/0169585 A1 | 7/2008 | Zinniel |
| 2009/0035405 A1 | 2/2009 | Leavitt |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0021580 A1 | 1/2010 | Swanson et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0100224 A1 | 4/2010 | Comb et al. |
| 2010/0283172 A1 | 11/2010 | Swanson |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2012/0018924 A1 | 1/2012 | Swanson et al. |
| 2012/0068378 A1 | 3/2012 | Swanson et al. |
| 2012/0070523 A1 | 3/2012 | Swanson et al. |

OTHER PUBLICATIONS

U.S. Appl. No. 12/888,098, filed Sep. 22, 2010, entitled "Method for Building Three-Dimensional Models with Extrusion-Based Additive Manufacturing Systems", pp. 1-30.

International Search Report and Written Opinion of International Application No. PCT/US2011/066446, filed Dec. 21, 2011.

International Search Report and Written Opinion of International Application No. PCT/US2011/066454, filed Dec. 21, 2011.

U.S. Appl. No. 12/612,329, filed Nov. 4, 2009, entitled "Ribbon Liquefier for Use in Extrusion-Based Digital Manufacturing Systems".

U.S. Appl. No. 12/612,333, filed Nov. 4, 2009, entitled "Non-Cylindrical Filaments for Use in Extrusion-Based Digital Manufacturing Systems".

U.S. Appl. No. 12/612,342, filed Nov. 4, 2009, entitled "Consumable Materials Having Topographical Surface Patterns for Use in Extrusion-Based Digital Manufacturing Systems".

U.S. Appl. No. 12/622,042, filed Nov. 19, 2009, entitled "Consumable Materials Having Encoded Markings for Use With Direct Digital Manufacturing Systems".

U.S. Appl. No. 12/888,087, filed Sep. 22, 2010, entitled "Liquefier Assembly for Use in Extrusion-Based Additive Manufacturing Systems".

U.S. Appl. No. 12/888,098, filed Sep. 22, 2010, entitled Method for Building Three-Dimensional Models With Extrusion-Based Additive Manufacturing Systems.

U.S. Appl. No. 12/949,898, filed Nov. 19, 2010, entitled "Encoded Consumable Materials and Sensor Assemblies for Use in Additive Manufacturing Systems".

U.S. Appl. No. 61/312,737, filed Mar. 11, 2010, entitled "Incremental Optical Encoder".

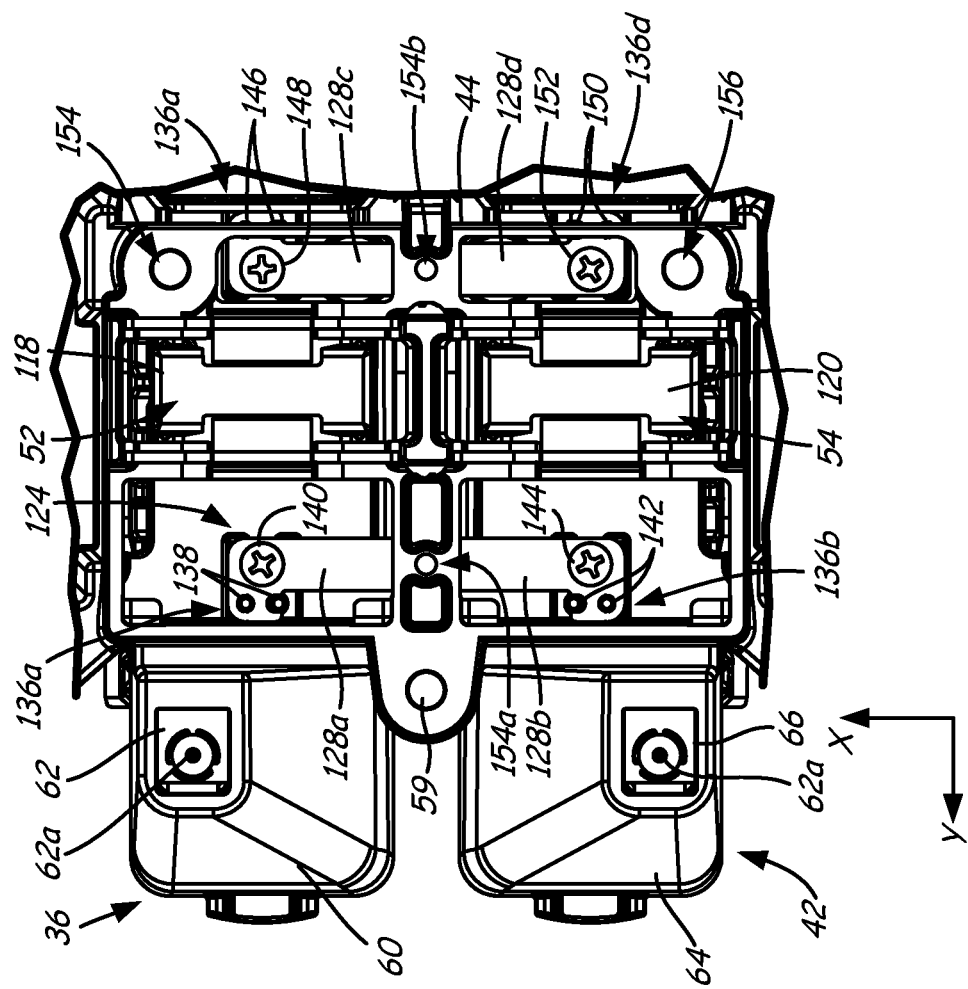
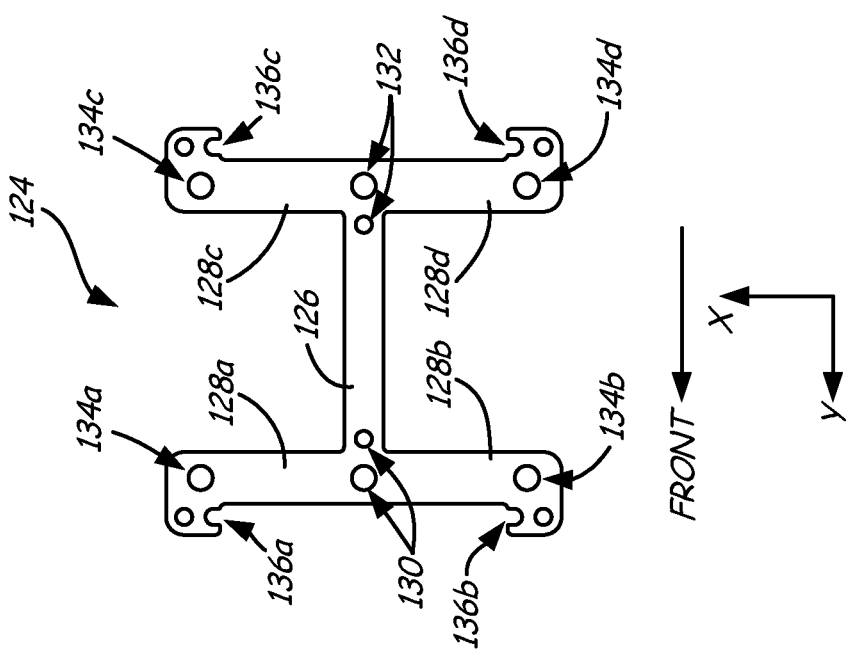

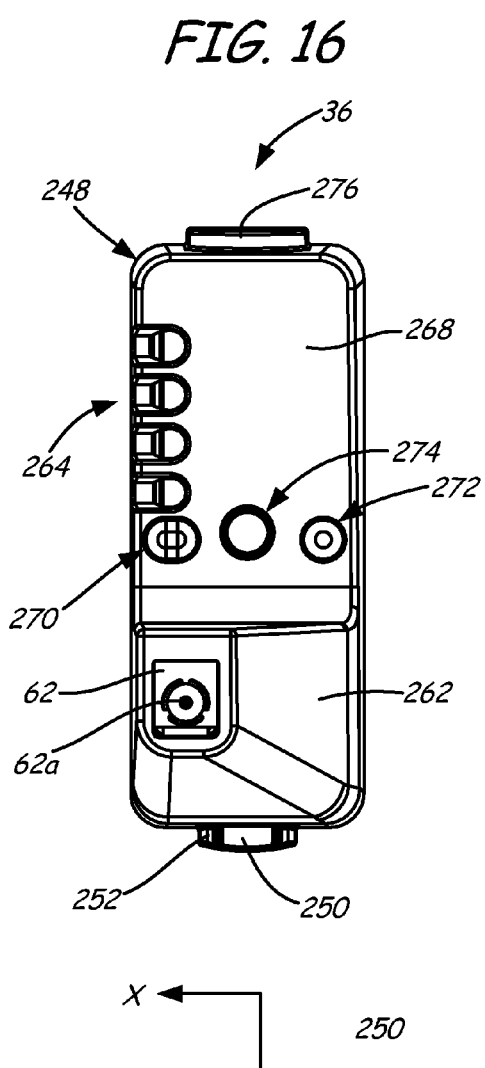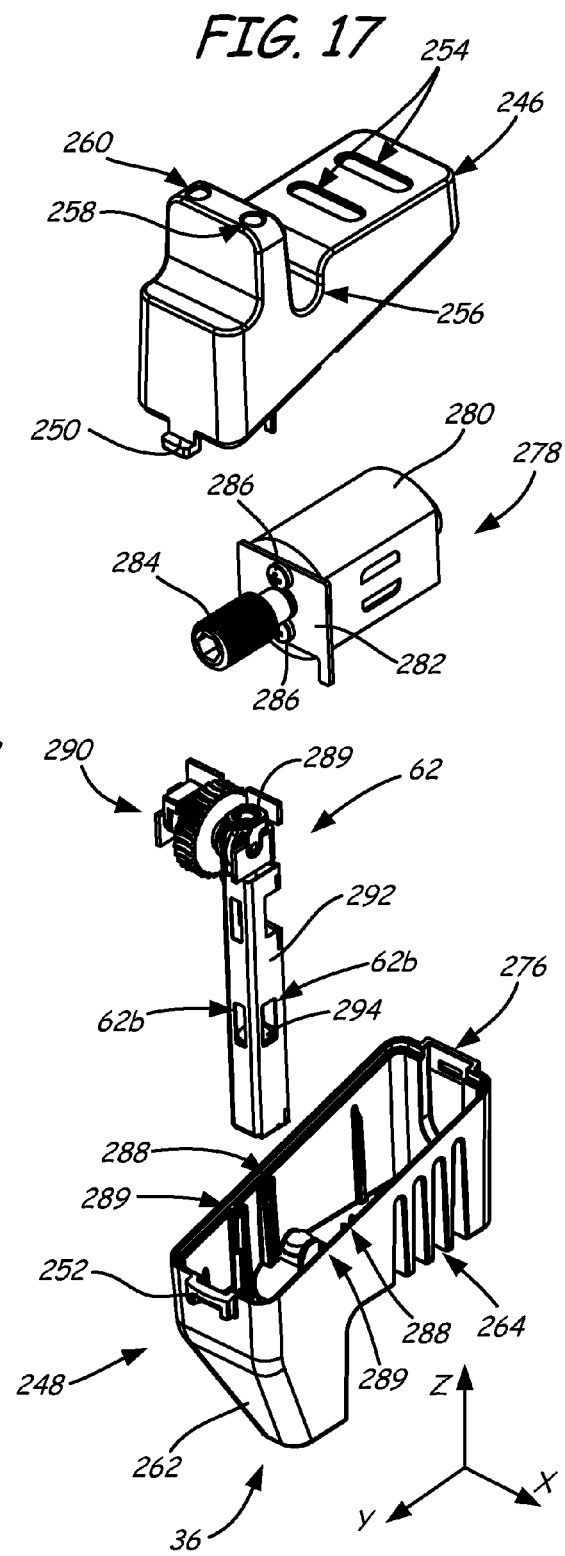

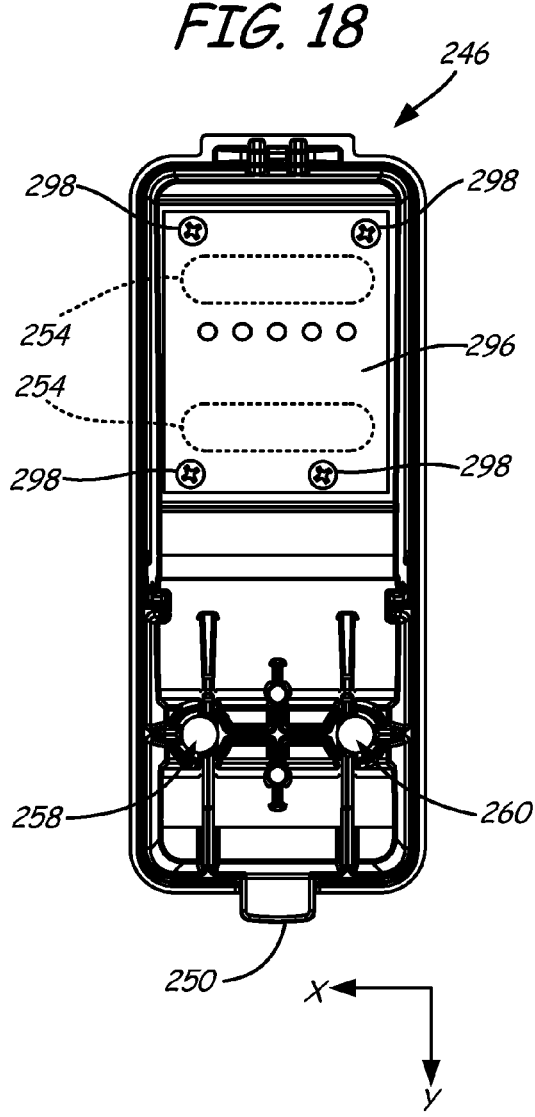
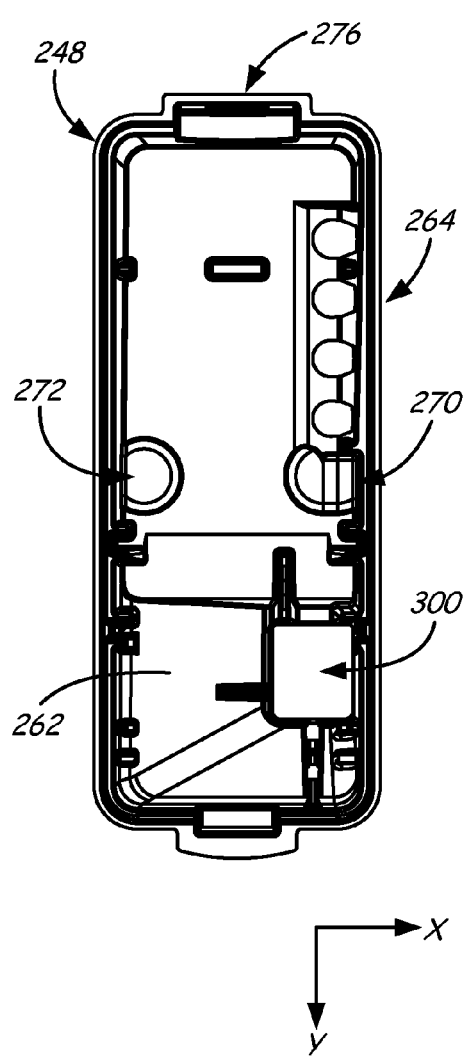
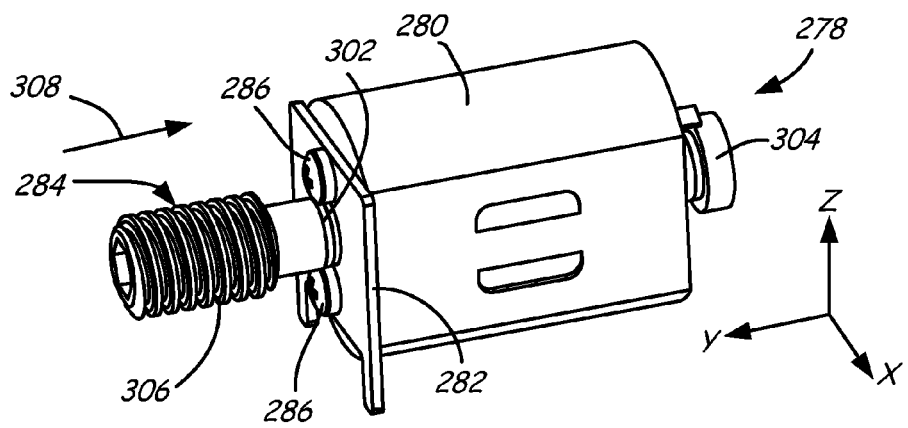

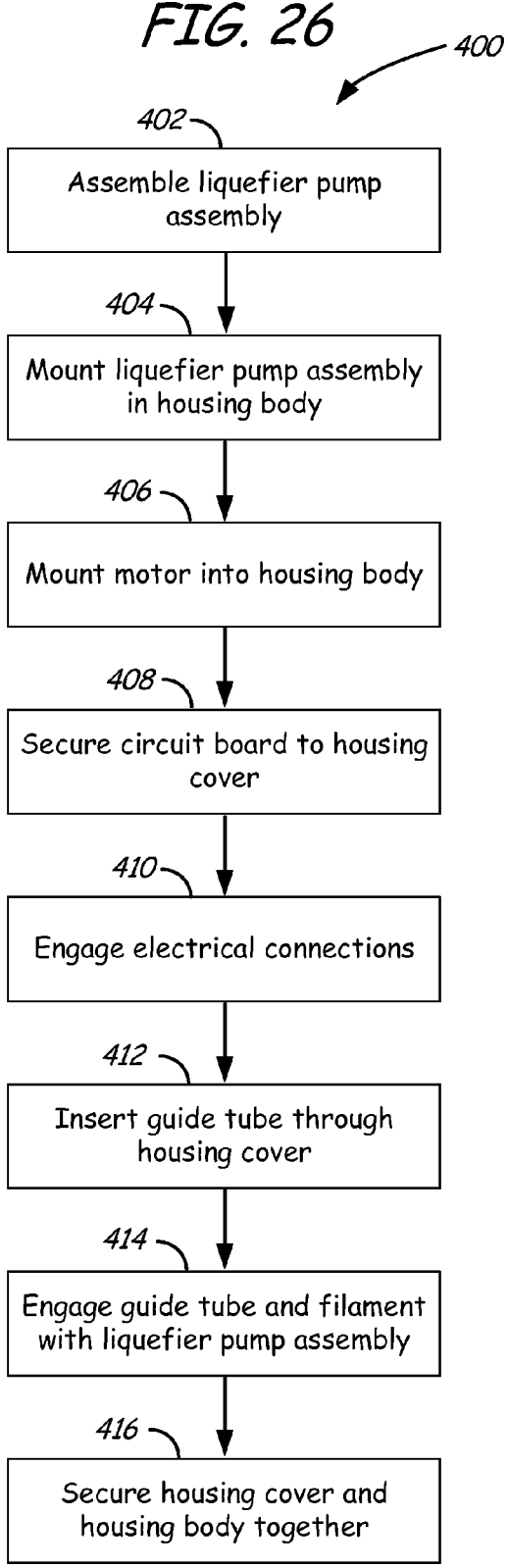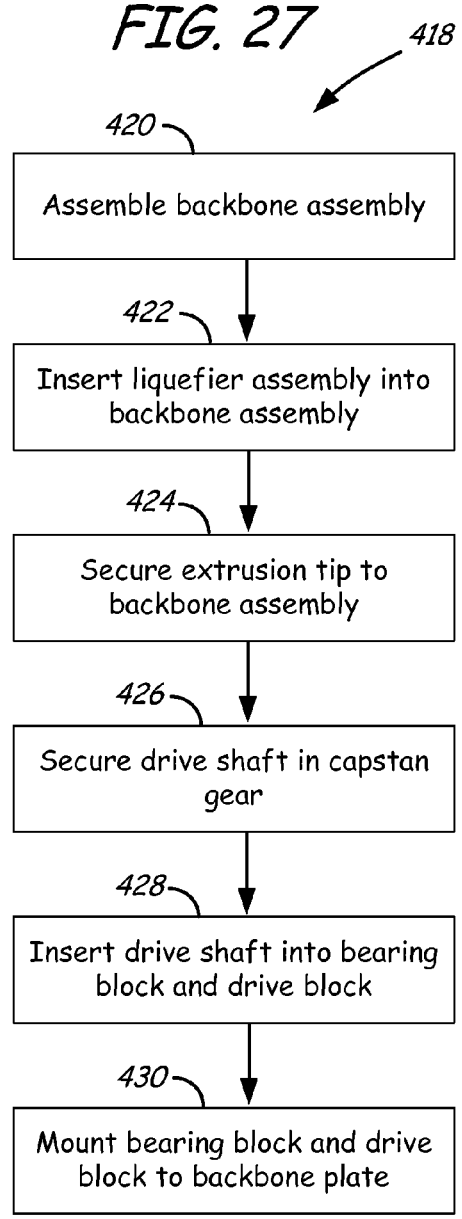

US 8,663,533 B2

METHOD OF USING PRINT HEAD ASSEMBLY IN FUSED DEPOSITION MODELING SYSTEM

CROSS-REFERENCE TO RELATED APPLICATION(S)

Reference is hereby made to co-filed U.S. patent application Ser. No. 12/976,111, entitled "Print Head Assembly For Use In Fused Deposition Modeling System"; to co-filed U.S. patent application Ser. No. 12/976,179, entitled "Voice Coil Mechanism For Use In Additive Manufacturing System"; to co-filed U.S. patent application Ser. No. 12/976,204, entitled "Print Head For Use In Fused Deposition Modeling System"; and to co-filed U.S. Design patent application No. 29/381,753, entitled "Print Head".

BACKGROUND

The present disclosure relates to additive manufacturing systems for building three-dimensional (3D) parts with layer-based, additive manufacturing techniques. In particular, the present disclosure relates to print head assemblies for use in fused deposition modeling systems.

A fused deposition modeling system is used to build a 3D part or model from a digital representation of the 3D part in a layer-by-layer manner by extruding a flowable part material. The part material is extruded through an extrusion tip carried by an extrusion head, and is deposited as a sequence of roads on a substrate in an x-y plane. The extruded part material fuses to previously deposited modeling material, and solidifies upon a drop in temperature. The position of the extrusion head relative to the substrate is then incremented along a z-axis (perpendicular to the x-y plane), and the process is then repeated to form a 3D part resembling the digital representation.

Movement of the extrusion head with respect to the substrate is performed under computer control, in accordance with build data that represents the 3D part. The build data is obtained by initially slicing the digital representation of the 3D part into multiple horizontally sliced layers. Then, for each sliced layer, the host computer generates a build path for depositing roads of modeling material to form the 3D part.

In fabricating 3D parts by depositing layers of a modeling material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the build process. The support material adheres to the modeling material during fabrication, and is removable from the completed 3D part when the build process is complete.

SUMMARY

An aspect of the present disclosure is directed to a method for building a 3D part with a fused deposition modeling system having a print head carriage. The method includes loading a print head to a receptacle of the print head carriage, where the receptacle is supported from a carriage frame of the print head carriage. The method also includes actuating a snap-fit mechanism to secure the loaded print head to the receptacle, feeding a material with the secured print head, melting the fed material in the secured print head, extruding the molten material from the secured print head to form at least a portion of the 3D part, and removing the print head from the receptacle.

Another aspect of the present disclosure is directed to a method for building a 3D part with a fused deposition modeling system having a print head carriage, where the method includes inserting at least a portion of a print head into a receptacle base portion of the print head carriage, the receptacle base portion being suspended from a carriage frame of the print head carriage. The method also includes closing a receptacle lid against the receptacle base portion to retain the inserted portion of the print head in a manner that prevents the print head from moving relative to the receptacle base portion. The method further includes moving the print head carriage along at least one axis of a plane, and moving the receptacle base portion with the closed receptacle lid relative to the print head carriage along an axis that is substantially orthogonal to the plane.

Another aspect of the present disclosure is directed to a method for building a 3D part with a fused deposition modeling system having a print head carriage, where the method includes suspending a receptacle of the print head carriage from a carriage frame of the print head carriage in a manner that prevents movement of the receptacle relative to the carriage frame in a substantially horizontal plane. The method also includes loading a print head to the receptacle, securing the loaded print head to the receptacle to prevent the loaded print head from moving relative to the receptacle, moving the print head carriage in the horizontal plane, and moving the receptacle relative to the carriage frame substantially along a vertical axis.

BRIEF DESCRIPTION OF THE DRAWINGS

FIG. 6 is a bottom view of the lower flexure of the carriage.

FIG. 7 is a bottom view of a portion of the print head assembly, illustrating an engagement of the lower flexure with the carriage.

FIG. 16 is a bottom view of the print head.

FIG. 17 is an exploded, front perspective view of the print head.

FIG. 18 is a bottom view of a housing cover of the print head.

FIG. 19 is a top view of a housing body of the print head.

FIG. 20 is a front, top perspective view of a motor of the print head.

FIG. 26 is a flow diagram of a method for assembling the print head.

FIG. 27 is a flow diagram of a method for assembling the liquefier pump assembly.

DETAILED DESCRIPTION

Figure 1:
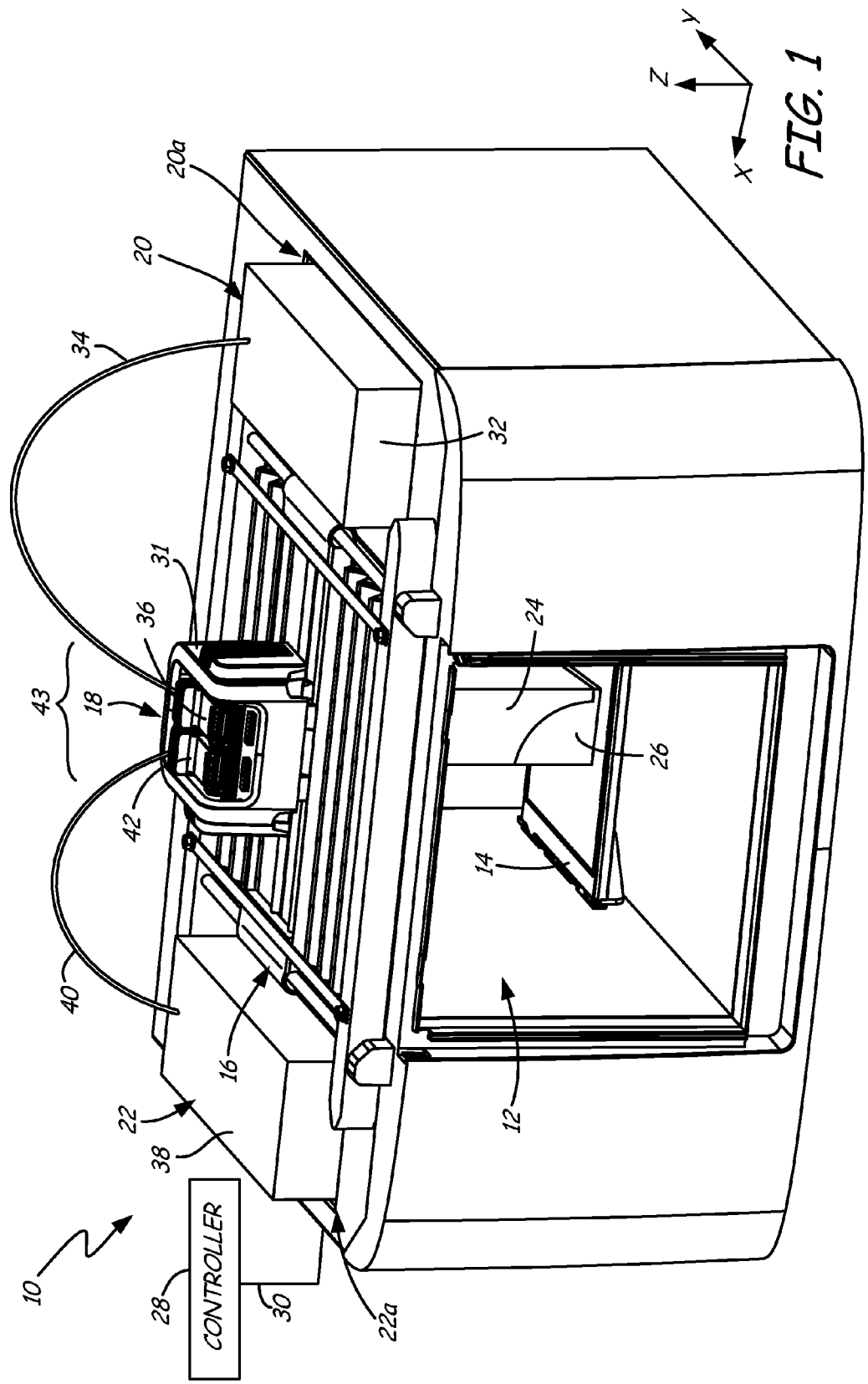
FIG. 1 is a top perspective view of a fused deposition modeling system, which includes a print head assembly of the present disclosure.

The present disclosure is directed to a print head assembly for use in a fused deposition modeling system. The print head assembly includes a moveable, print head carriage and multiple, replaceable print heads that are configured to be removably retained by the print head carriage. As discussed below, the print head carriage includes a carriage frame and at least one, and more desirably two or more print head buckets or receptacles that are configured to receive and retain the removable print heads.

The receptacles may be supported by the carriage frame in a manner that prevents or otherwise restricts the receptacles from moving relative to the carriage frame along an axis or plane (e.g., a horizontal plane). In one embodiment, the receptacles are also supported by the carriage frame in a manner that allows the receptacles to move relative to the carriage along at least one axis (e.g., along a vertical axis), providing a single degree of freedom for movement. Additionally, the receptacles desirably lock the received print heads to prevent their shifting relative to the receptacles. While the print heads are retained in the receptacles of the print head carriage, the fused disposition modeling system may build 3D parts and support structures using the fused deposition modeling technique.

The present disclosure is also directed to one or more voice coil mechanisms of the print head assembly, where each voice coil mechanism is configured to raise and lower a receptacle and the received print head relative to the carriage frame. This toggling technique allows the fused deposition modeling system to switch between part material extrusion and support material extrusion with precise control of the vertical movements.

As discussed below, each voice coil mechanism may include one or more magnet sets disposed between ferromagnetic plates, where the magnet set(s) are configured to generate magnetic fields. Each voice coil mechanism may also include a voice coil disposed within the generated magnetic fields and configured to move relative to the generated magnetic fields based on an intensity and direction of an electrical current induced through the voice coil. In one embodiment, the voice coil is retained by the receptacle and the magnet set(s) are retained by the carriage frame. In this embodiment, the movement of the voice coil relative to the generated magnetic fields may move the receptacle and received print head relative to the carriage frame to toggle the print head between one or more raised and lowered elevations.

The present disclosure is also directed to a removable print head for use with the print head carriage and the fused deposition modeling system, and a method of assembling the print head. The print head is configured to be received and retained in the receptacle of the print head carriage, and has a liquefier pump assembly that may include a self-aligning feature to align a received filament with a liquefier portion of the liquefier pump assembly. In one embodiment, the print head may also include a flow pathway configured to direct an air flow through the print head. As discussed below, these arrangements allow the print head to efficiently feed, melt, and extrude successive portions of filaments of part and support materials.

FIG. 1 is a perspective view of system 10, which is an example of a fused deposition modeling system that may incorporate the print head assembly of the present disclosure. Suitable fused deposition modeling systems for system 10 include those developed by Stratasys, Inc., Eden Prairie, Minn. As shown, system 10 includes build chamber 12, platen 14, gantry 16, print head carriage 18, and consumable assemblies 20 and 22.

Build chamber 12 is an enclosed environment that contains platen 14 for building a 3D part or model 24 and a corresponding support structure 26 with part and support consumable materials (e.g., thermoplastic materials). Build chamber 12 is desirably heated to reduce the rate at which the part and support materials solidify after being extruded and deposited (e.g., to reduce distortions and curling). In alternative embodiments, build chamber 12 may be omitted and/or replaced with different types of build environments. For example, 3D part 24 and support structure 26 may be built in a build environment that is open to ambient conditions or may be enclosed with alternative structures (e.g., flexible curtains). The build environment may also be heatable in a variety of manners (e.g., with heated circulating air, heat lamps, and the like).

Platen 14 is a gantry-moveable platform on which 3D part 24 and support structure 26 are built, and moves along a vertical z-axis based on signals provided from a computer-operated controller (referred to as controller 28). Controller 28 is one or more processor-based controllers, which may communicate with build chamber 12, platen 14, gantry 16, and carriage 18 over communication line 30. While illustrated as a single signal line, communication line 30 may include one or more signal lines, allowing controller 28 to communicate with various components of system 10, such as build chamber 12, platen 14, gantry 16, and carriage 18. Furthermore, while illustrated outside of system 10, controller 28 and communication line 30 may be internal components to system 10.

Gantry 16 is a guide-rail, gantry mechanism configured to move carriage 18 in a horizontal x-y plane above build chamber 12 based on signals provided from controller 28 (via communication line 30). The horizontal x-y plane is a plane defined by an x-axis and a y-axis, where the x-axis, the y-axis, and the z-axis are orthogonal to each other. In an alternative embodiment, platen 14 may be configured to move in the horizontal x-y plane within build chamber 12, and carriage 18 may be configured to move along the z-axis. Other similar arrangements may also be used such that one or both of platen 14 and carriage 18 are moveable relative to each other.

In the shown embodiment, when mounted in gantry 16, the front side of carriage 18 faces the rear side of system 10. For ease of discussion, the following disclosure is made with reference to particular orientations within an x-y-z Cartesian coordinate system, based on the orientation of carriage 18 and its corresponding print head assembly. However, the print head assembly of the present disclosure may alternatively be positioned and operated in a variety of different orientations and/or coordinate systems.

Carriage 18 is supported by gantry 16 for building 3D parts (e.g., 3D part 24) and corresponding support structures (e.g., support structure 26) on platen 14 in a layer-by-layer manner, based on signals provided from controller 28. In the shown embodiment, carriage 18 is retained within cowling 31, which is a casing (e.g., a plastic and/or metallic casing) that laterally extends around carriage 18 to protect carriage 18, while also allowing a user to access to carriage 18. As discussed below, carriage 18 is configured to receive one or more removable print heads, where the print heads are each configured to receive and melt successive portions of part and support material filaments.

Consumable assemblies 20 and 22 are removable and replaceable container devices configured to retain supplies of the part and support materials for building 3D parts (e.g., 3D part 24) and support structures (e.g., support structure 26), and may be respectively loaded into bays 20a and 22a of system 10. In the shown embodiment, consumable assembly 20 includes container portion 32, guide tube 34, and print head 36, where container portion 32 is mountable within bay 20a and print head 36 is inserted or otherwise loaded into carriage 18. Guide tube 34 interconnects container portion 32 and print head 36 to supply successive segments of a part material filament from container portion 32 to print head 36.

Correspondingly, consumable assembly 22 includes container portion 38, guide tube 40, and printer head 42, where container portion 38 is mountable within bay 22a and print head 42 is inserted or otherwise loaded into carriage 18, adjacent to print head 36. Guide tube 40 interconnects container portion 38 and print head 42 to supply successive segments of a support material filament from container portion 38 to print head 42.

In the shown example, suitable assemblies for consumable assemblies 20 and 22 include those disclosed in Swanson, U.S. Patent Application Publication No. 2010/0283172 and International Publication No. WO2009/088995, which are incorporated by reference in their entireties to the extent that they do not conflict with the present disclosure. As disclosed in these references, print heads 36 and 42 may be provided as subcomponents of consumable assemblies 20 and 22. When container portions 32 and 38 are respectively loaded to bays 20a and 22a, print heads 36 and 42 may be manipulated and loaded into carriage 18.

The combination of carriage 18 and print heads 36 and 42 are collectively referred to herein as print head assembly 43. Accordingly, after print head 36 is inserted or otherwise loaded into carriage 18, successive portions of a part material (e.g., a part material filament) may be fed from container portion 32 to print head 36 through guide tube 34. Similarly, after print head 42 is inserted or otherwise loaded into carriage 18, successive portions of a support material (e.g., a support material filament) may be fed to print head 42 from container portion 38 through guide tube 40.

As the part and support materials are selectively fed to print heads 36 and 42, gantry 16 may move carriage 18 (and the retained print heads 36 and 42) around in the horizontal x-y plane above build chamber 12. Print head 36 thermally melts the successive portions of the received part material, thereby allowing the molten part material to be extruded and deposited on to platen 14 to build 3D part 24. Similarly, print head 42 thermally melts the successive portions of the support material, thereby allowing the molten support material to be extruded and deposited on to platen 14 to build support structure 26.

The extruded part and support materials are deposited onto platen 14 to build 3D part 24 and support structure 26 in a layer-based manner using the fused deposition modeling technique. Support structure 26 is desirably deposited to provide vertical support along the z-axis for overhanging regions of the layers of 3D part 24. After the build operation is complete, the resulting 3D part 24 and support structure 26 may be removed from build chamber 12, and support structure 26 may be removed from 3D part 24. 3D part 23 may then undergo one or more additional post-processing steps, such as the surface-treatment processes disclosed in Priedeman, et al., U.S. Patent Application Publication No. 2005/0173838 and U.S. Patent Application Publication No. 2008/0169585.

The following discussion of system 10 is made with reference to consumable assemblies 20 and 22 that include print heads (i.e., print heads 36 and 42) as subcomponents of the consumable assemblies. However, in alternative embodiments, print heads 36 and 42 may be removable print heads that are separate from container portions 32 and 38 and/or guide tubes 34 and 40. In these embodiments, suitable assemblies (e.g., spooled containers) for consumable assemblies 20 and 22 include those disclosed in Swanson, U.S. Patent Application Publication No. 2010/0283172 and International Publication No. WO2009/088995, as well as those disclosed in Swanson et al., U.S. Pat. No. 6,923,634; Comb et al., U.S. Pat. No. 7,122,246; and Taatjes et al, U.S. Patent Application Publication Nos. 2010/0096485 and 2010/0096489.

FIGS. 2-9 illustrate print head assembly 43, showing carriage 18 in use with print heads 36 and 42. Carriage 18 and print heads 36 and 42 are desirably low-weight components. The use of low-weight components for print head assembly 43 reduces the mass that gantry 16 (shown in FIG. 1) is required to move around in the horizontal x-y plane. This reduced mass correspondingly reduces the inertial forces that are generated when moving print head assembly 43 around in the horizontal x-y plane (e.g., in raster patterns), thereby improving the response time control of gantry 16 and also reducing wear on the subcomponents of gantry 16.

Figure 2:
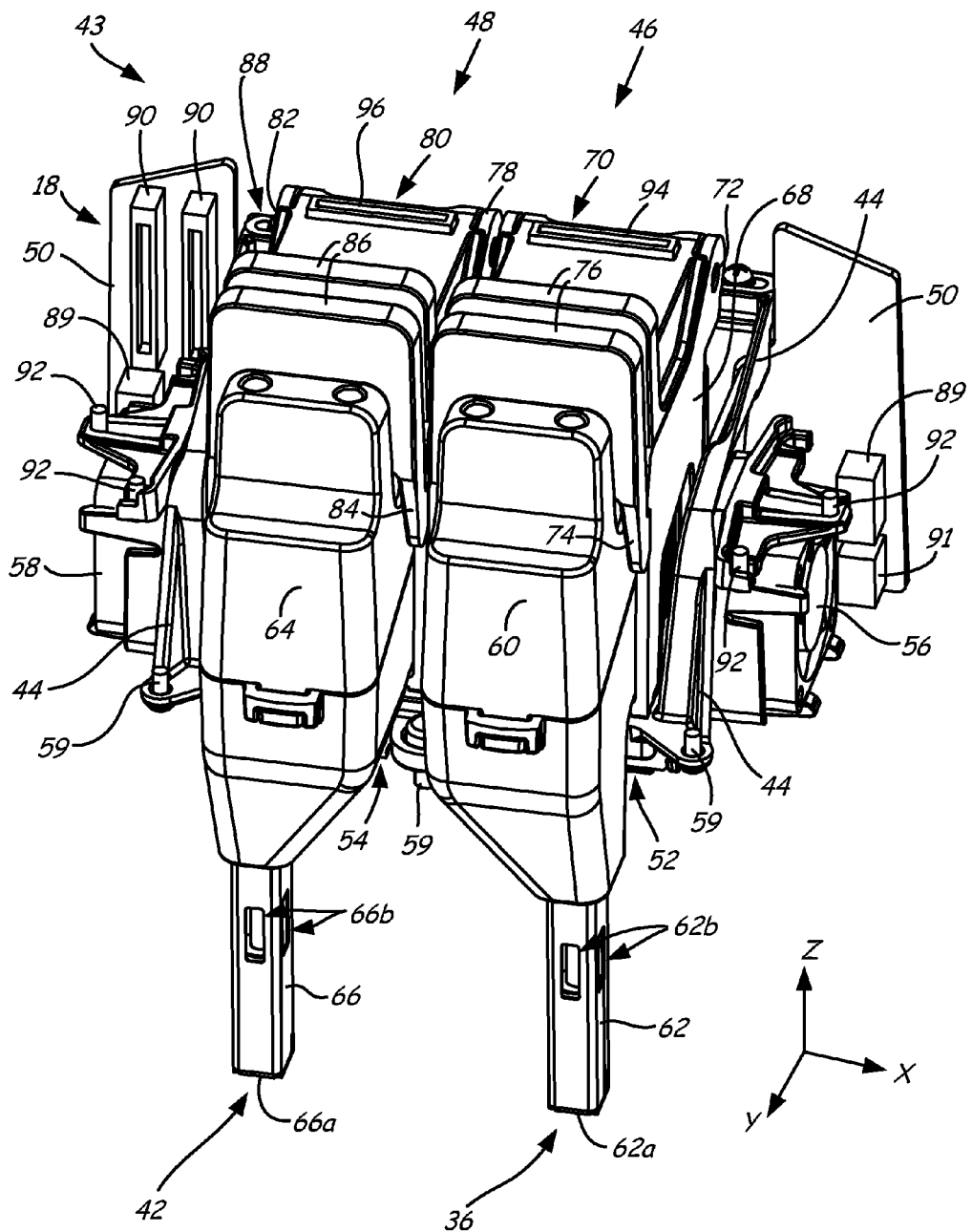
FIG. 2 is a front, top perspective view of the print head assembly, which includes a carriage, a pair of removable print heads, and a pair of voice coil mechanisms.

As shown in FIG. 2, carriage 18 includes carriage frame 44, print head buckets or receptacles 46 and 48, control board 50, voice coil mechanisms 52 and 54 (located below receptacles 46 and 48), and cooling units 56 and 58. Carriage frame 44 is a rigid frame member that is operably secured to gantry 16 (shown in FIG. 1) with multiples fasteners (e.g., screws 59). Carriage frame 44 may be molded or cast from one or more metallic and/or plastic materials.

Receptacles 46 and 48 are the components of carriage 18 that respectively retain print heads 36 and 42, and may also be molded or cast from one or more metallic and/or plastic materials. Print head 36 includes cartridge assembly 60 and liquefier pump assembly 62, where a rear portion of cartridge assembly 60 is retained within receptacle 46 and liquefier pump assembly 62 extends downward from a front portion of cartridge assembly 60. Similarly, print head 42 includes cartridge assembly 64 and liquefier pump assembly 66, where a rear portion of cartridge assembly 64 is retained within receptacle 48 and liquefier pump assembly 66 extends downward from a front portion of cartridge assembly 64. Liquefier pump assemblies 62 and 66 respectively include tip ends 62a and 66a, and outlet vents 62b and 66b.

In the shown embodiment, print heads 36 and 42 are minor images of each other. This reduces the risk of inserting the incorrect print head into a given receptacle. In comparison, in the shown embodiment, receptacles 46 and 48 are identical or substantially identical, allowing the same mold to be used to manufacture the components of both receptacles 46 and 48. In alternative embodiments, print heads 36 and 42, and receptacles 46 and 48 may exhibit different designs such that print heads 36 and 42 may be received and retained by receptacles 46 and 48 in the manners discussed below.

Receptacle 46 includes base portion 68 and lid 70, where lid 70 is hingedly connected to an upper rear section of base portion 68 with hinge connection 72, allowing lid 70 to open and close relative to base portion 68. Prior to use in system 10 (shown in FIG. 1), cartridge assembly 60 (of print head 36) may be inserted or otherwise loaded into base portion 68, and lid 70 may be closed down over the rear portion of cartridge assembly 60 to secure print head 36 to receptacle 46.

Lid 70 includes lock clamps 74 and pinch actuator 76. When closed against base portion 68 (as shown in FIG. 2), lock clamps 74 engage base portion 68 to prevent lid 70 from unintentionally opening. When a user desires to open lid 70, the user may squeeze pinch actuator 76, which disengages lock clamps 74 from base portion 68, thereby allowing the user to then open lid 70.

Receptacle 48 includes base portion 78 and lid 80, where lid 80 is hingedly connected to an upper rear section of base portion 78 with hinge connection 82, allowing lid 80 to open and close relative to base portion 78. Prior to use in system 10, cartridge assembly 64 (of print head 42) may be inserted or otherwise loaded into base portion 78 and lid 80 may be closed down over the rear portion of cartridge assembly 64 to secure print head 42 to receptacle 48.

Lid 80 includes lock clamps 84 and pinch actuator 86. When closed against base portion 78 (as shown in FIG. 2), lock clamps 84 engage base portion 78 to prevent lid 80 from unintentionally opening in the same manner as discussed above for lock clamps 74. When a user desires to open lid 80, the user may squeeze pinch actuator 86, which disengages lock clamps 84 from base portion 78, thereby allowing the user to then open lid 80.

Receptacles 46 and 48 desirably prevent print heads 36 and 42 from shifting around within receptacles 46 and 48 while lids 70 and 80 are closed. System 10 is configured to build 3D part 24 and support structure 26 with high-resolution features. To attain such high-resolution features, print heads 36 and 42 are desirably locked to carriage frame 44 in a manner that prevents unintentional shifting of print heads 36 and 42 relative to carriage frame 44 in the horizontal x-y plane. Otherwise, even small amounts of unintentional horizontal shifting by either of print heads 36 and 42 may result in deposition road errors in the formed layers of 3D part 24 and support structure 26.

In current commercial fused deposition modeling systems, such as those commercially available from Stratasys, Inc., Eden Prairie, Minn., the extrusion or print heads are secured to the moveable gantry carriages using screws or other fasteners. These print heads are typically not uninstalled from the moveable gantry carriages other than for maintenance, cleaning, or other similar purposes. In such situations, after being reinstalled to the moveable gantry carriages, the print heads are typically calibrated before each build run to reduce the risk of deposition road errors. Since the print heads are securely installed to the moveable gantry carriages, they pose little risk of shifting relative to the moveable gantry carriages during the build runs.

In comparison, print heads 36 and 42 are intended to be readily removed and replaced when their consumable materials are exhausted. This replaceable nature of print heads 36 and 42 poses an added challenge to maintaining proper registration between print heads 36 and 42 and carriage frame 44 during build runs. This challenge is further increased since print heads 36 and 42 (and receptacles 46 and 48) are also moveable along the vertical z-axis via voice coil mechanisms 52 and 54.

Accordingly, as discussed below, carriage 18 is configured to receive multiple, replaceable print heads print heads 36 and 42, and to securely lock the received print heads 36 and 42 to prevent their unintentional shifting relative to carriage frame 44 in the horizontal x-y plane. In particular, when lids 70 and 80 are closed, receptacles 46 and 48 securely lock print heads 36 and 42, which prevents print heads 36 and 42 from moving relative to receptacles 46 and 48 in any direction.

Receptacles 46 and 48 themselves are suspended from carriage frame 44 in a manner that allows controlled movement of receptacles 46 and 48 (and print heads 36 and 42) relative to carriage frame 44 along the vertical z-axis via voice coil mechanisms 52 and 54, while also preventing unintentional movement of receptacles 46 and 48 (and print heads 36 and 42) relative to carriage frame 44 in the horizontal x-y plane. For example, receptacles 46 and 48 may be suspended from carriage frame 44 with upper flexure 88, located behind the upper rear sections of receptacles 46 and 48, as discussed below. As used herein, phrases such as "preventing movement or shifting of the print heads" and the like are intended to encompass insubstantial amounts of movement or shifting as is understood by those skilled in the art, such that the movements or shifting of the print heads do not substantially affect the resolutions of the 3D parts or support structures.

Voice coil mechanisms 52 and 54 are toggle mechanisms configured to controllably move receptacles 46 and 48 (and print heads 36 and 42) upward and downward along the vertical z-axis, independently of each other. As discussed in Leavitt, U.S. Pat. No. 7,625,200, toggle mechanisms, such as voice coil mechanisms 52 and 54, allow print heads 36 and 42 to each switch between a lowered, active state for extruding a material and a raised, passive state. In one embodiment, as discussed below, voice coil mechanisms 52 and 54 each include one or more magnet sets (not shown in FIG. 2) disposed between magnetic plates (not shown in FIG. 2), where the magnet set(s) are configured to generate magnetic fields.

Voice coil mechanisms 52 and 54 may each also include a voice coil (not shown in FIG. 2) disposed within the generated magnetic fields and configured to move relative to the generated magnetic fields based on an intensity and direction of an electrical current induced through the voice coil. As discussed below, the movement of the voice coil relative to the generated magnetic fields may move receptacle 46 or 48 and received print head 36 or 42 relative to carriage frame 44 to toggle print head 36 or 42 between one or more raised and lowered elevations. Voice coil mechanisms 52 and 54 may also include electrical connections (e.g., cables, not shown) to interfaces 89 of control board 50 to receive electrical power from control board 50 for inducing the electrical currents through the voice coils.

Control board 50 is a printed circuit board or other similar device secured to the rear side of carriage frame 44. As shown, control board 50 includes interfaces 90 and 91, where interfaces 90 may be operably connected to communication line 30 (shown in FIG. 1), power sources, and/or other electrical ports within system 10 (not shown) with the use of electrical cables and/or wireless connections (not shown). For example, interfaces 90 may relay electrical power from system 10 to print heads 36 and 42, control board 50, voice coil mechanisms 52 and 54 (via interfaces 89), and cooling units 56 and 58. Interfaces 90 may also allow controller 28 (shown in FIG. 1) to direct the operation of print heads 36 and 42, voice coil mechanisms 52 and 54, and cooling units 56 and 58, as discussed below.

Interfaces 91 are electrical interfaces that allow electrical power to be relayed from control board 50 to cooling units 56 and 58 over additional electrical connections (e.g., cables, not shown). As also discussed below, control board 50 may include one or more position encoders for tracking or otherwise monitoring the positions of print heads 36 and 42 relative to carriage 18 and control board 50 (e.g., vertical positions).

Cooling units 56 and 58 are fan-based units secured to gantry 16 and/or carriage frame 44 (e.g., with screws 92). Cooling units 56 and 58 are configured to create and direct air flows into print heads 36 and 42. For example, cooling unit 56 may draw air into cartridge assembly 60 of print head 36, where the air is then directed downward through liquefier pump assembly 62 and out of outlet vents 62b. Similarly, cooling unit 58 may draw air into cartridge assembly 64 of print head 42, where the air is then directed downward through liquefier pump assembly 66 and out of outlet vents 66b. The forced air flows cool the internal components of print heads 36 and 42 and prevent the part and support materials from prematurely melting. In alternative embodiments, other types of cooling units may be used for cooling units 56 and 58, which may be fan-based units or non-fan-based units (e.g., refrigeration-based units).

Figure 3:
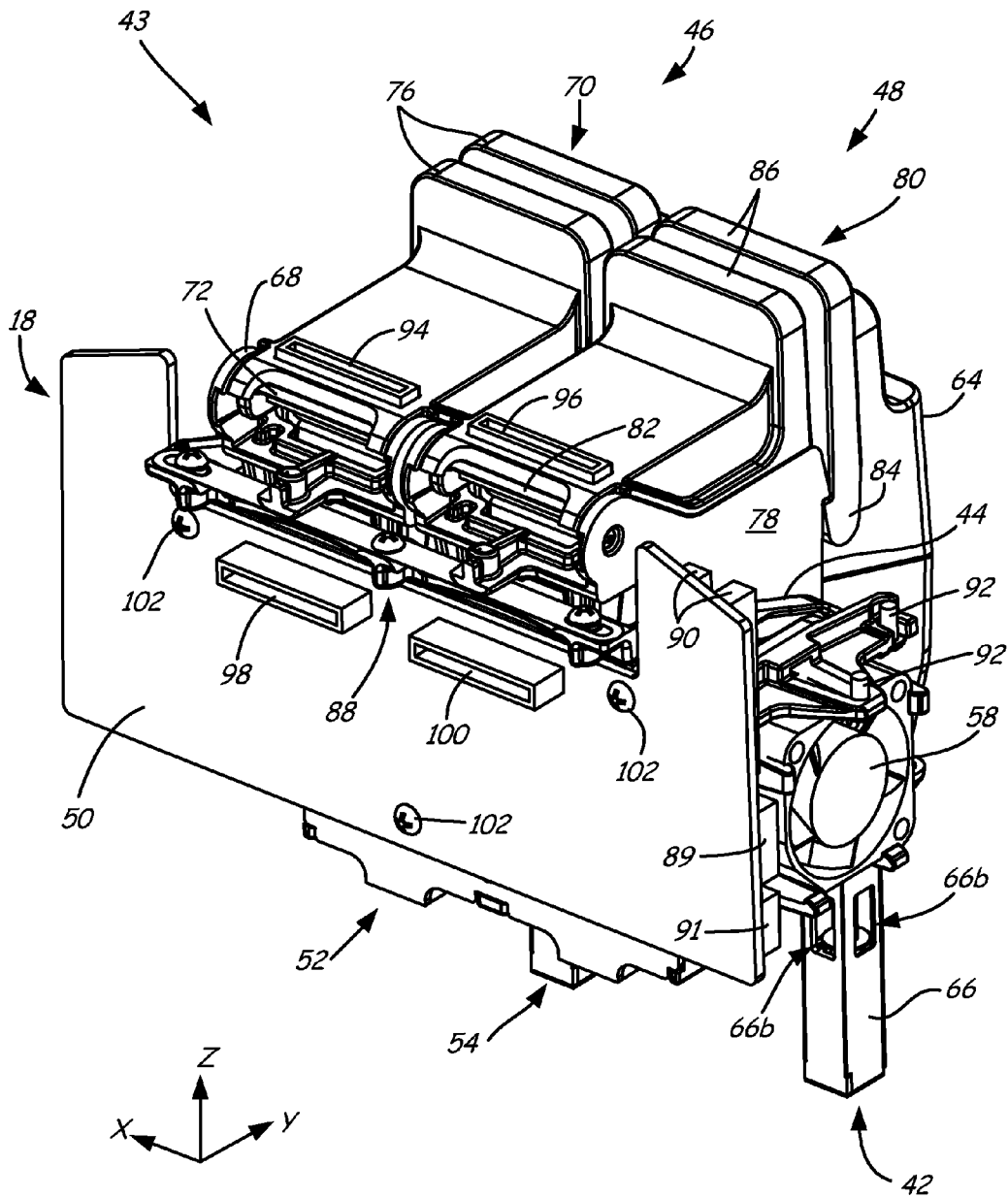
FIG. 3 is a rear, top perspective view of the print head assembly.

Lids 70 and 80 of receptacles 46 and 48 also include electrical interfaces 94 and 96, which are located on the outer surfaces of lids 70 and 80, adjacent to the top rear side of carriage 18. As shown in FIG. 3, control board 50 also includes interfaces 98 and 100, which are ports configured to communicate with electrical interfaces 94 and 96, respectively, over electrical connections (e.g., cables, not shown). This arrangement allows control board 50 to relay electrical power and communication information to and between print heads 36 and 42 and itself. Control board 50 may be secured to carriage frame 44 with screws 102 or other similar fasteners.

In the shown embodiment, carriage 18 also includes upper flexure 88, which is a flexible metallic or plastic member that is secured to carriage frame 44. As discussed below, upper flexure 88 and a lower flexure (not shown in FIG. 3) support receptacles 46 and 48 in a manner that prevents receptacles 46 and 48 (and the retained print heads 36 and 42) from moving horizontally, while allowing a limited range of vertical movement due to the flexing of upper flexure 88 and the lower flexure.

Figure 4:
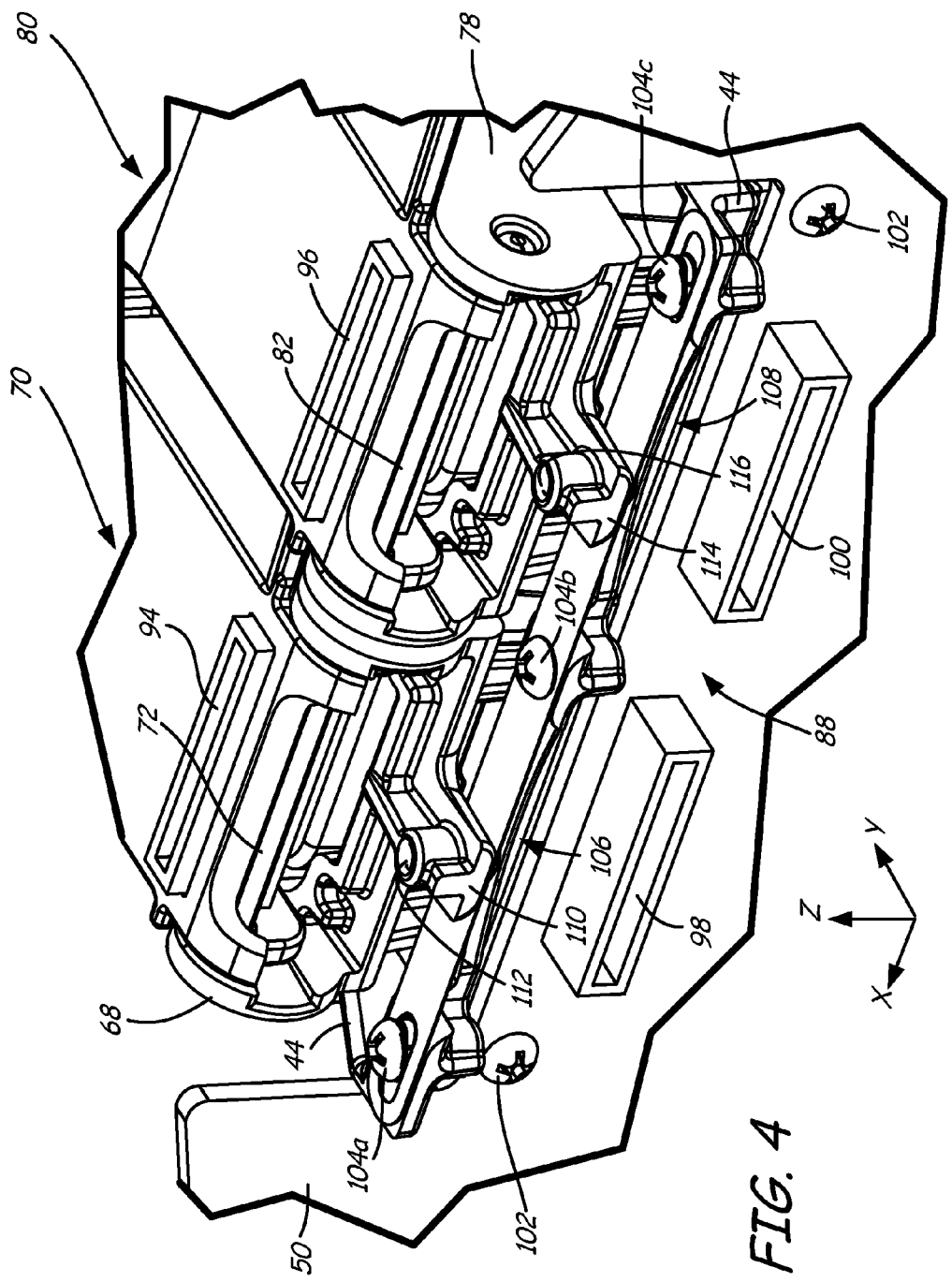
FIG. 4 is an expanded rear, top perspective view of the print head assembly, illustrating an upper flexure of the carriage.

As shown in FIG. 4, upper flexure 88 is secured to carriage frame 44 with screws 104a-104c or other similar fasteners. This coupling prevents upper flexure suspension 88 from moving relative to carriage frame 44 other than by flexing. The spaced apart locations of screws 104a-104c separates upper flexure suspension 88 into flexure segments 106 and 108, where flexure segment 106 is located between screws 104a and 104b, and flexure segment 108 is located between screws 104b and 104c. Flexure segments 106 and 108 are each configured to flex upward, downward, or a combination of upward and downward relative to carriage frame 44, independently of each other.

Base portion 68 of receptacle 46 includes tab member 110 extending rearwardly from the body of base portion 68, and is secured to flexure segment 106 with screw 112 or other similar fastener. Screw 112 couples receptacle 46 to flexure segment 106, which allows receptacle 46 and print head 36 to move upwards and downwards (via voice coil mechanism 52, shown in FIGS. 2 and 3) relative to carriage frame 44 with the flexing of flexure segment 106 (and the lower flexure, not shown in FIG. 4). This coupling also prevents lateral movement of receptacle 46 and print head 36 in the horizontal x-y plane relative to carriage frame 44, as well as preventing roll, pitch, and yaw movements.

Base portion 78 of receptacle 48 includes tab member 114 extending rearwardly from the body of base portion 78, and is secured to flexure segment 108 with screw 116 or other similar fastener. Screw 116 couples receptacle 48 to flexure segment 108, which allows receptacle 48 and print head 42 to move upwards and downwards (via voice coil mechanism 54, shown in FIGS. 2 and 3) relative to carriage frame 44 with the flexing of flexure segment 108 (and the lower flexure, not shown in FIG. 4). This coupling also prevents lateral movement of receptacle 48 and print head 42 in the horizontal x-y plane relative to carriage frame 44, as well as preventing roll, pitch, and yaw movements.

During assembly of carriage 18, upper flexure 88 may be positioned on carriage frame 44 as shown in FIG. 4, and screws 104a-104c may be inserted through openings upper flexure 88 and into carriage frame 44 to secure upper flexure 88 to carriage frame 44. Tab members 110 and 114 may be coupled to flexure segments 106 and 108 with screws 112 and 116 to retain base portions 68 and 78 to upper flexure 88.

Figure 5:
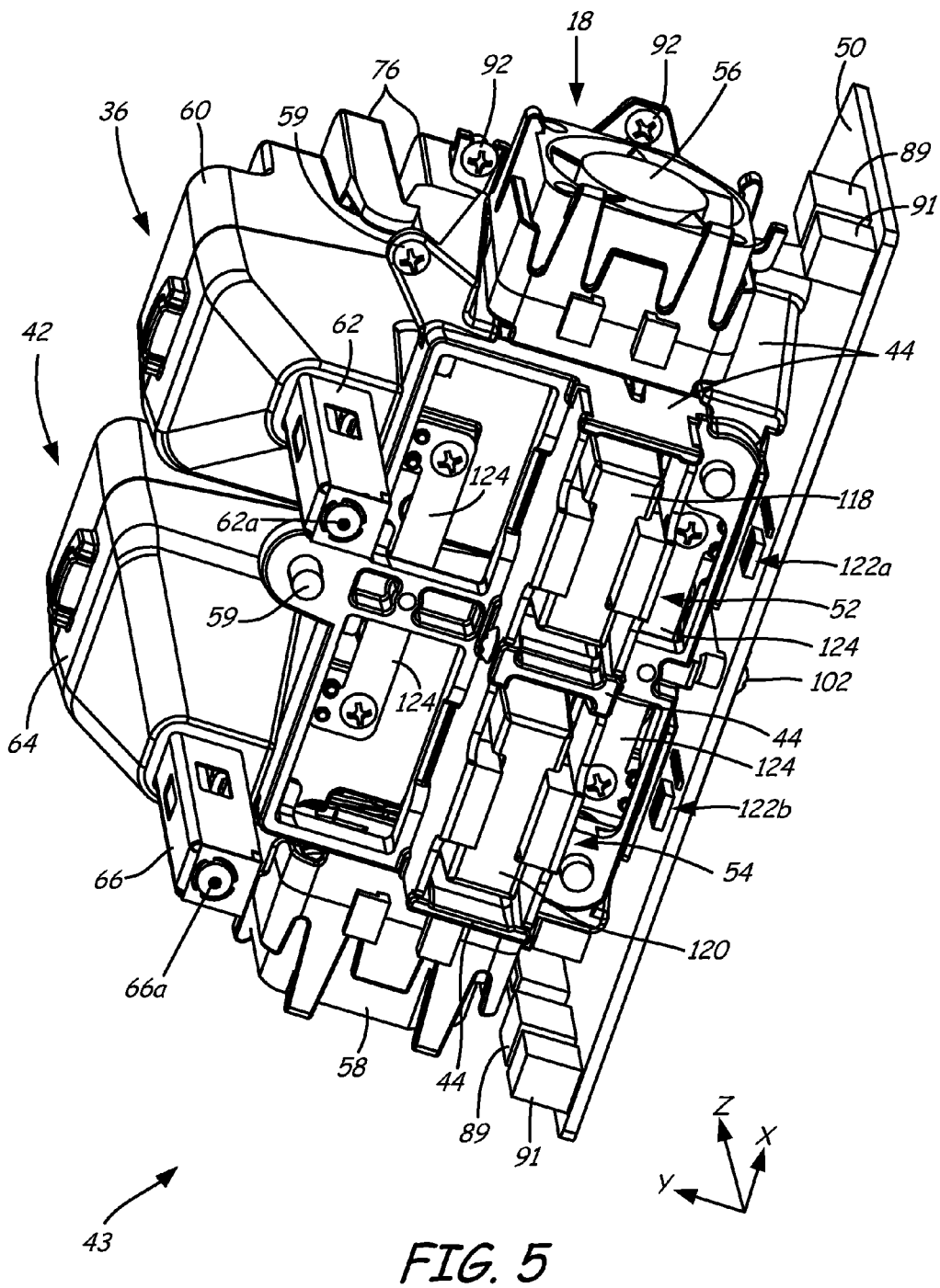
FIG. 5 is a front, bottom perspective view of the print head assembly, illustrating a lower flexure of the carriage.

As shown in FIG. 5, which is a bottom perspective view of print head assembly 43, receptacles 46 and 48 respectively include lower extensions 118 and 120. Lower extension 118 extends below base portion 68 and retains a portion of voice coil mechanism 52 (e.g. a voice coil, not shown in FIG. 5). Similarly, lower extension 120 extends below base portion 78 and retains a portion of voice coil mechanism 54 (e.g. a voice coil, not shown in FIG. 5). As further shown in FIG. 5, the front side of control board 50 includes sensor arrays 122a and 122b, which are subcomponents of a pair of optical encoder assemblies that are configured to measure positions of receptacles 46 and 48 (e.g., vertical positions), as discussed below.

Carriage 18 also includes lower flexure 124, which, in the shown embodiment, has an H-shape geometry. Lower flexure 124 is a flexible metallic or plastic member disposed vertically between the bottom surfaces of base portions 68 and 78 and the bottom portion of carriage frame 44.

As shown in FIG. 6, lower flexure 124 includes central segment 126 extending along the y-axis, and arms 128a-128d, where arms 128a and 128b are front arms that extend in opposing directions along the x-axis from a front end of central segment 126, and arms 128c and 128d are rear arms that extend in opposing directions along the x-axis from a rear end of central segment 126.

Central segment 126 includes openings 130 and 132 respectively at the front and rear ends of central segment 126. Openings 130 and 132 are attachment points for securing central segment 126 to carriage frame 44 (shown in FIGS. 2-5) with fasteners (e.g., screws, not shown). Arms 128a-128d respectively include openings 134a-134d and pin slots 136a-136d. Lower flexure 124 has a symmetrical geometry, allowing either end to face forward. This arrangement increases the ease in assembling carriage 18 by allowing lower flexure 124 to be secured to base portions 68 and 78, and to carriage frame 44 regardless of its orientation.

As shown in FIG. 7, lower flexure 124 is secured to base portions 68 and 78 at arms 128a-128d. In particular, arm 128a is aligned with a front section of base portion 68 with alignment pins 138 that extend through pin slots 136a. Arm 128a is secured to base portion 68 with screw 140 or other similar fastener, which extends through opening 134a in arm 128a. Correspondingly, arm 128b is aligned with a front section of base portion 78 with alignment pins 142 that extend through pin slots 136b. Arm 128b is secured to base portion 78 with screw 144 or other similar fastener, which extends through opening 134b in arm 128b.

Arm 128c is aligned with a rear section of base portion 68 with alignment pins 146 that extend through pin slots 136c (both partially obstructed by carriage frame 44 in FIG. 7). Arm 128c is secured to base portion 68 with screw 148 or other similar fastener, which extends through opening 134c in arm 128c. Arm 128d is correspondingly aligned with a rear section of base portion 78 with alignment pins 150 that extend through pin slots 136d (both partially obstructed by carriage frame 44 in FIG. 7). Arm 128d is secured to base portion 78 with screw 152 or other similar fastener, which extends through opening 134d in arm 128d.

In addition, lower flexure 124 may be aligned with and secured to carriage frame 44 at bottom openings 154a and 154b of carriage frame 44 with screws and/or pins (not shown) or other similar fasteners. Openings 154a and 154b extend along the y-axis and are aligned with openings 130 and 132 of lower flexure 124. Accordingly, during assembly of carriage 18, lower flexure 124 may be positioned along carriage frame 44 as shown in FIG. 7, and screws and/or pins may be inserted through openings 154a and 154b of carriage frame 44, and through openings 130 and 132 of lower flexure 124 to secure central segment 126 (shown above in FIG. 6) to carriage frame 44. Base portions 68 and 78 may then be positioned on to carriage frame 44 and arms 128a-128d of lower flexure 124 may be secured to base portions 68 and 78. This secures lower flexure 124 between carriage frame 44 and base portions 68 and 78, thereby supporting base portions 68 and 78 from carriage frame 44. As discussed above, base portions 68 and 78 may also be further supported from carriage frame 44 with upper flexure 88 (shown above in FIGS. 3 and 4).

Arms 128a-128d are each configured to flex upward, downward, or a combination of upward and downward along the vertical z-axis relative to carriage frame 44, where arms 128a and 128c (secured to base portion 68) may flex together and arms 128b and 128d (secured to base portion 78) may flex together. Accordingly, arms 128a and 128c (along with flexure segment 106 of upper flexure 88, shown in FIG. 4) allow receptacle 46 and print head 36 to move upwards and downwards (via voice coil mechanism 52) relative to carriage frame 44. These couplings also prevent movement of receptacle 46 and print head 36 in the horizontal x-y plane relative to carriage frame 44, as well as preventing roll, pitch, and yaw movements. Similarly, arms 128b and 128d (along with flexure segment 108 of upper flexure 88, shown in FIG. 4) allow receptacle 48 and print head 42 to move upwards and downwards (via voice coil mechanism 54) relative to carriage frame 44. These couplings also prevent movement of receptacle 48 and print head 42 in the horizontal x-y plane relative to carriage frame 44, as well as preventing roll, pitch, and yaw movements.

While illustrated with a pair of flexures (i.e., upper flexure 88 and lower flexure 124) that provide three connection points for each receptacle 46 and 48, carriage 18 may alternatively include additional flexures and/or additional connection points to further prevent movement of receptacles 46 and 48 relative to carriage frame 44 in the horizontal x-y plane. For example, carriage 18 may alternatively include a pair of upper flexures and a pair of lower flexures for each receptacle, where each upper and lower flexure is operably secured to carriage frame 44. This provides four connection points for each receptacle, thereby further preventing horizontal movement, while allowing controlled vertical movement with voice coil mechanisms 52 and 54.

In additional alternative embodiments, one or both of upper flexure 88 and lower flexure 124 may be replaced with alternative mechanisms that are configured to suspend base portions 68 and 78 from carriage frame 44, while also preventing or restricting movement of base portions 68 and 78 in the horizontal x-y plane relative to carriage frame 44 (and preventing roll, pitch, and yaw movements). For example, upper flexure 88 may be replaced with a rigid member that pivotably interconnects base portions 68 and 78 with carriage frame 44 in a seesaw or lever-based manner.

In this embodiment, the rigid member may be pivotably connected to carriage frame 44 at the location of screw 104b (shown in FIG. 4), such as with a pin joint. Tab members 110 and 114 of base portions 68 and 78 may then be secured to the rigid member (e.g., pivotably secured) at the locations of screws 112 and 116 (shown in FIG. 4). Accordingly, voice coil mechanism 52 may toggle receptacle 46 and print head 36 upward while voice coil mechanism 54 toggles receptacle 48 and print head 42 downward, which pivots the rigid member around its pivotable connection with carriage frame 44. The pivoting action allows print heads 36 and 42 to move vertically, while also preventing or restricting their movements in the horizontal x-y plane.

In further alternative embodiments, the rigid member may be replaced with a pair of independent rigid members, which may be pivotably connected to carriage frame 44, and separately connected to tab members 110 and 114 of base portions 68 and 78. This arrangement allows print heads 36 and 42 to be toggled independently of each other. In yet further alternative embodiments, carriage 18 may include vertical linear bearings or bushings to prevent or restrict horizontal movement of base portions 68 and 78 relative to carriage frame 44, while also allowing vertical movement.

As further shown in FIG. 7, carriage frame 44 also includes a first pair of openings 154 below base portion 68, and a second pair of openings 156 below base portion 78. Only a single opening 154 and a single opening 156 are visible in FIG. 7. The second of openings 154 and 156 are hidden under arms 128c and 128d of lower flexure 124. As discussed below, openings 154 and 156 may receive screws or other similar fasteners (not shown) for securing carriage frame 44 to gantry 16 (shown in FIG. 1) along with screws 59, where the screws are insertable into openings 154 and 156 from above through base portions 68 and 78.

Figure 8:
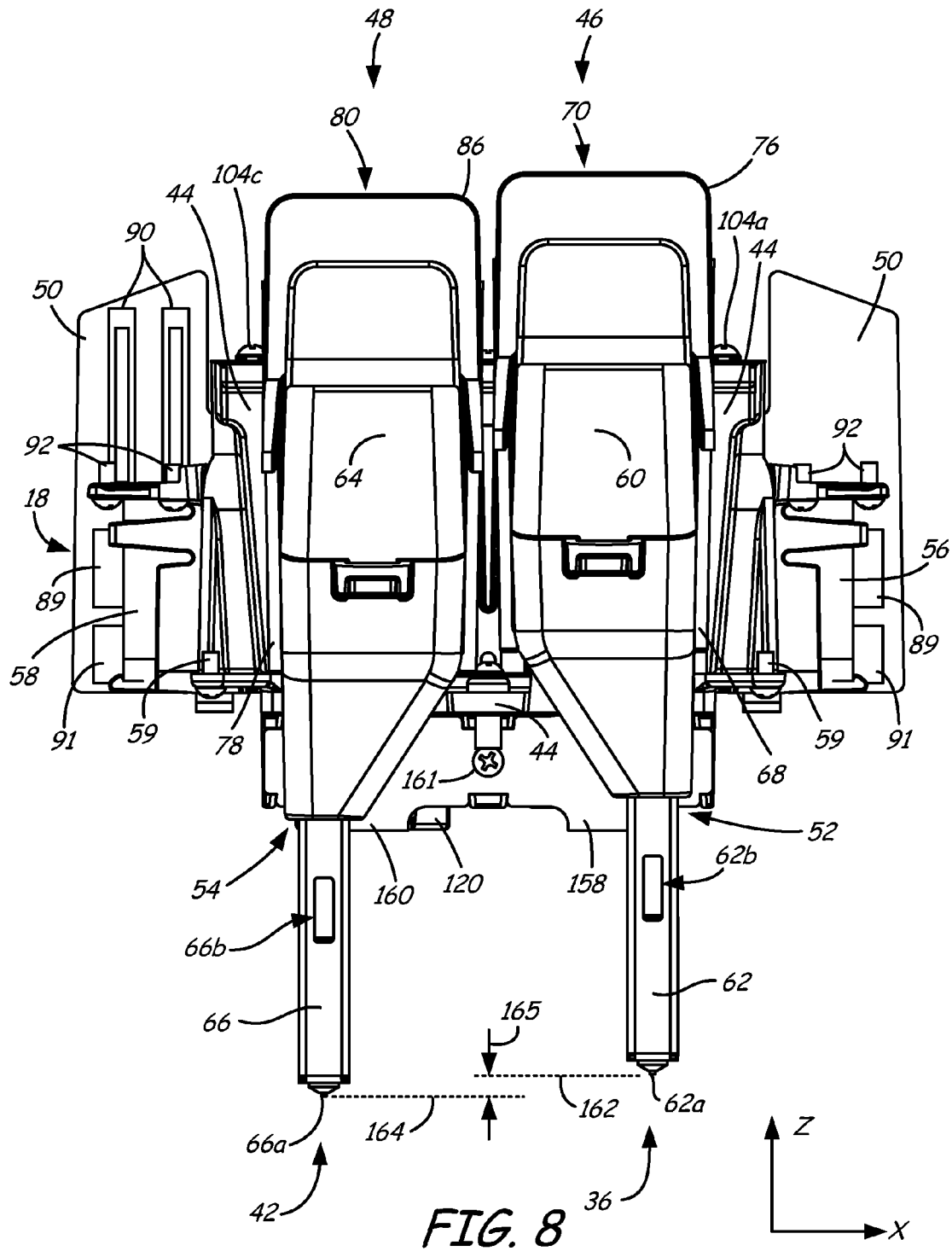
FIG. 8 is a front view of the print head assembly, illustrating the operation of voice coil mechanisms of the print head assembly.

FIG. 8 illustrates the toggling of receptacles 46 and 48 with the use of voice coil mechanisms 52 and 54. As shown, voice coil mechanism 52 includes front plate 158 and voice coil mechanism 54 includes front plate 160. In the shown embodiment, front plates 158 and 160 are provided as a single plate that extends across the front sides of voice coil mechanisms 52 and 54, and which is secured to carriage frame 44 with screw 161 or other similar fastener. Front plates 158 and 160 are ferromagnetic plates that retain the magnet sets (not shown in FIG. 8) for voice coil mechanisms 52 and 54, as discussed below.

In the example shown in FIG. 8, print head 42 and receptacle 48 are positioned at a lower elevation along the vertical z-axis compared to print head 36 and receptacle 46. This is illustrated by the relative elevations of tip ends 62a and 66a, where tip end 62a is located at raised elevation 162 and tip end 66a is located at lowered elevation 164. Accordingly, print head 42 is in an active state for extruding the support material and print head 36 is in a passive state in which print head 36 does not extrude the part material.

Suitable distances between raised elevation 162 and lowered elevation 164 (referred to as distance 165) include at least about 0.5 millimeters, with particularly suitable distances 165 ranging from about 1.0 millimeters to about 3.0 millimeters, and with even more particularly suitable distances 165 ranging from about 1.3 millimeters to about 2.0 millimeters. The terms "about" and "substantially" are used herein with respect to measurable values and ranges due to expected variations known to those skilled in the art (e.g., limitations and variabilities in measurements). The raised elevation of tip end 62a relative to tip end 66a prevents tip end 62a from contacting the formed layers of 3D part 24 (shown in FIG. 1) or support structure 26 (shown in FIG. 1) while carriage 18 is moved around in the horizontal x-y plane above build chamber 12 (shown in FIG. 1).

Figure 9:
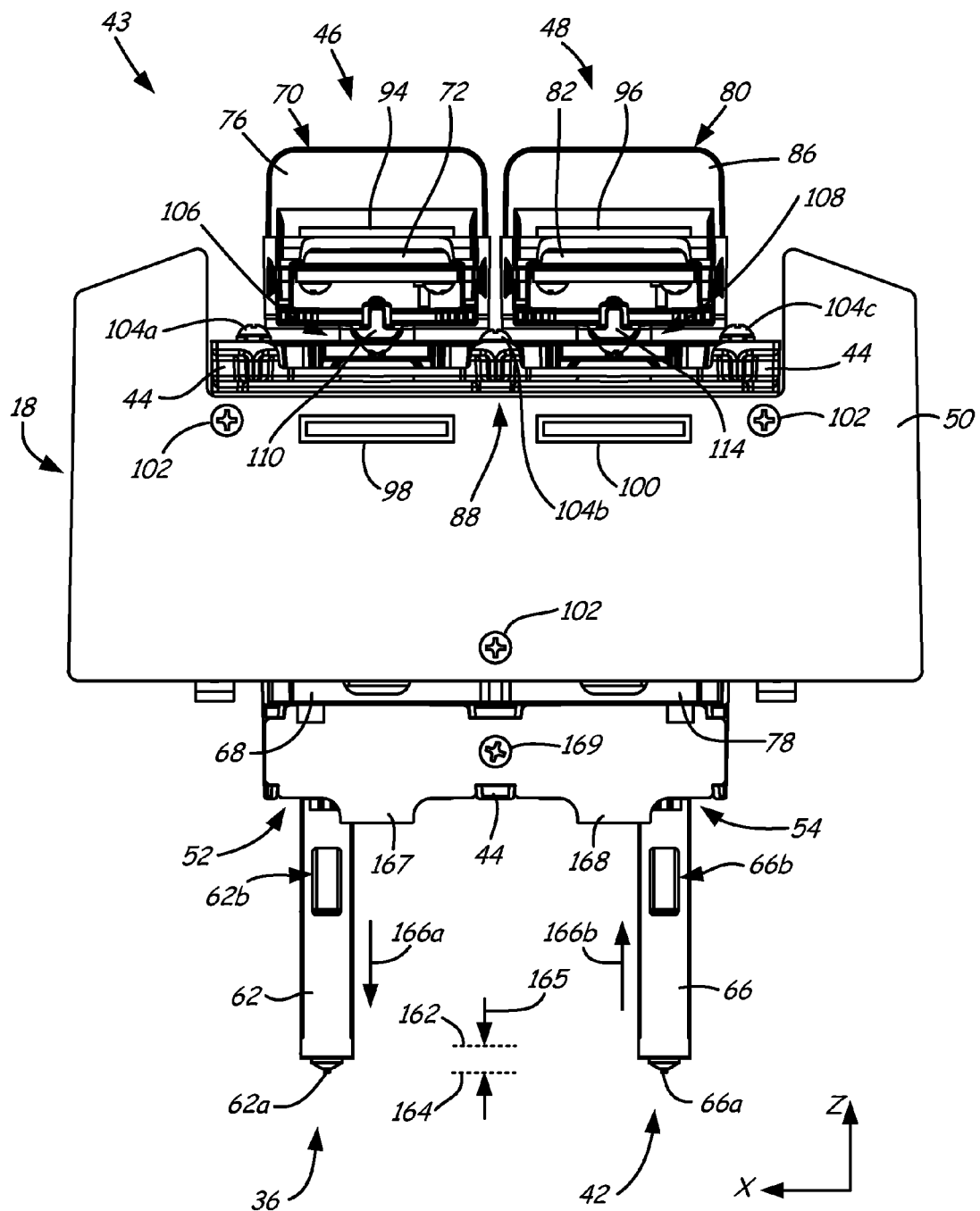
FIG. 9 is a rear view of the print head assembly, further illustrating the operation of the voice coil mechanisms.

FIG. 9 is a rear view of print head assembly 43, illustrating print head 36 being toggled downward from raised elevation 162 and print head 42 being toggled upward from lower elevation 164 in a simultaneous manner, as illustrated by arrows 166a and 166b. While receptacle 48 and print head 42 are in the lowered, active state (as shown above in FIG. 8), flexure segment 108 of upper flexure 88 and arms 128b and 128d of lower flexure 124 (shown above in FIGS. 5-7) are flexed downward along the vertical z-axis. Correspondingly, while receptacle 46 and print head 36 are in the raised, passive state, flexure segment 106 of upper flexure 88, and arms 128a and 128c of lower flexure 124 (shown in FIGS. 5-7) are un-flexed and level. Upper flexure 88 and lower flexure 124 accordingly restrict the movements of receptacles 46 and 48 and print heads 36 and 42 to upward and downward directions that are substantially along the vertical z-axis relative to carriage frame 44.

After a given layer of support structure 26 is completed, controller 28 (shown in FIG. 1) may direct voice coil mechanism 54 to raise receptacle 48 and print head 42 upward along the vertical z-axis from lowered elevation 164 to raised elevation 162 (or other suitable raised elevation along the vertical z-axis), as illustrated by arrow 166b. Flexure segment 108 of upper flexure 88 and arms 128b and 128d of lower flexure 124 accordingly flex upward along with receptacle 48 and print head 42 to reach un-flexed and level states.

Controller 28 may also direct voice coil mechanism 52 to lower receptacle 46 and print head 36 downward along the vertical z-axis from raised elevation 162 to lowered elevation 164 (or other suitable lowered elevation along the vertical z-axis), as illustrated by arrow 166a. Flexure segment 106 of upper flexure 88 and arms 128a and 128c of lower flexure 124 accordingly flex downward along with receptacle 46 and print head 36.

At this point in the build process, print head 36 is in an active state for extruding the part material and print head 42 is in a passive state in which print head 42 does not extrude the support material. The raised elevation of tip end 66a relative to tip end 62a prevents tip end 66a from contacting the formed layers of 3D part 24 or support structure 26 while carriage 18 is moved around in the horizontal x-y plane above build chamber 12.

After a given layer(s) of 3D part 24 is completed, controller 28 may then direct voice coil mechanism 52 to raise receptacle 46 and print head 36 upward along the vertical z-axis from lowered elevation 164 to raised elevation 162 (or other suitable raised elevation along the vertical z-axis). Controller 28 may also direct voice coil mechanism 54 to lower receptacle 48 and print head 42 downward along the vertical z-axis from raised elevation 162 to lowered elevation 164 (or other suitable lowered elevation along the vertical z-axis). This toggling places print head 42 back into the lowered, active state and places print head 36 back into the raised, passive state.

Print heads 36 and 42 may then continue to toggle interchangeably between the active and passive states with the use of voice coil mechanisms 52 and 54, where movement of print heads 36 and 42 are restricted to directions substantially along the vertical z-axis by upper flexure 88 and lower flexure 124. In alternative embodiments, the toggling process may be performed with the use of a single voice coil mechanism. For example, print head 36 may be fixed at a given elevation (voice coil mechanism 52 may be omitted), and voice coil mechanism 54 may move print head 42 between a lowered elevation and a raised elevation that are respectively below and above the fixed elevation of print head 36. Platen 14 may then be raised and lowered during the toggling process to accommodate the different elevations of print heads 36 and 42. However, the use of two voice coil mechanisms (i.e., voice coil mechanisms 52 and 54) allows the tip positions of print heads 36 and 42 (i.e., at tip ends 62a and 66a) to be independently calibrated, such as when one of print heads 26 and 42 needs to be replaced during the middle of a build run.

As further shown in FIG. 9, the voice coil mechanism 52 includes rear plate 167 and voice coil mechanism 54 includes rear plate 168. In the shown embodiment, rear plates 167 and 168 are also provided as a single plate that extends across the rear sides of voice coil mechanisms 52 and 54, and which is secured to carriage frame 44 with screw 169 or other similar fastener. Rear plates 167 and 168 are ferromagnetic plates that retain the magnet sets (not shown in FIG. 9) for voice coil mechanisms 52 and 54, along with front plates 158 and 160.

Figure 10:
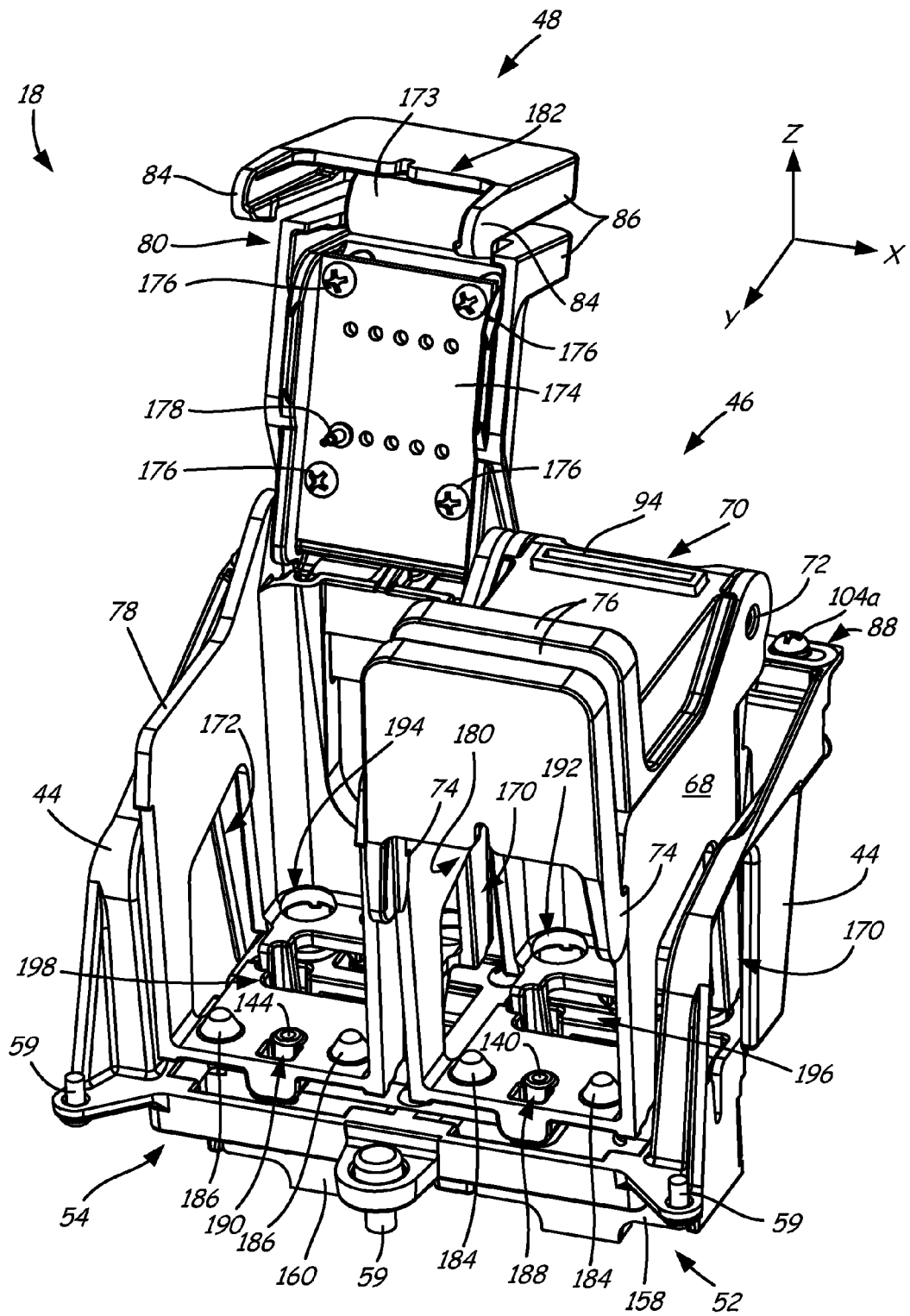
FIG. 10 is a front, top perspective view of the carriage without the print heads.
Figure 11:
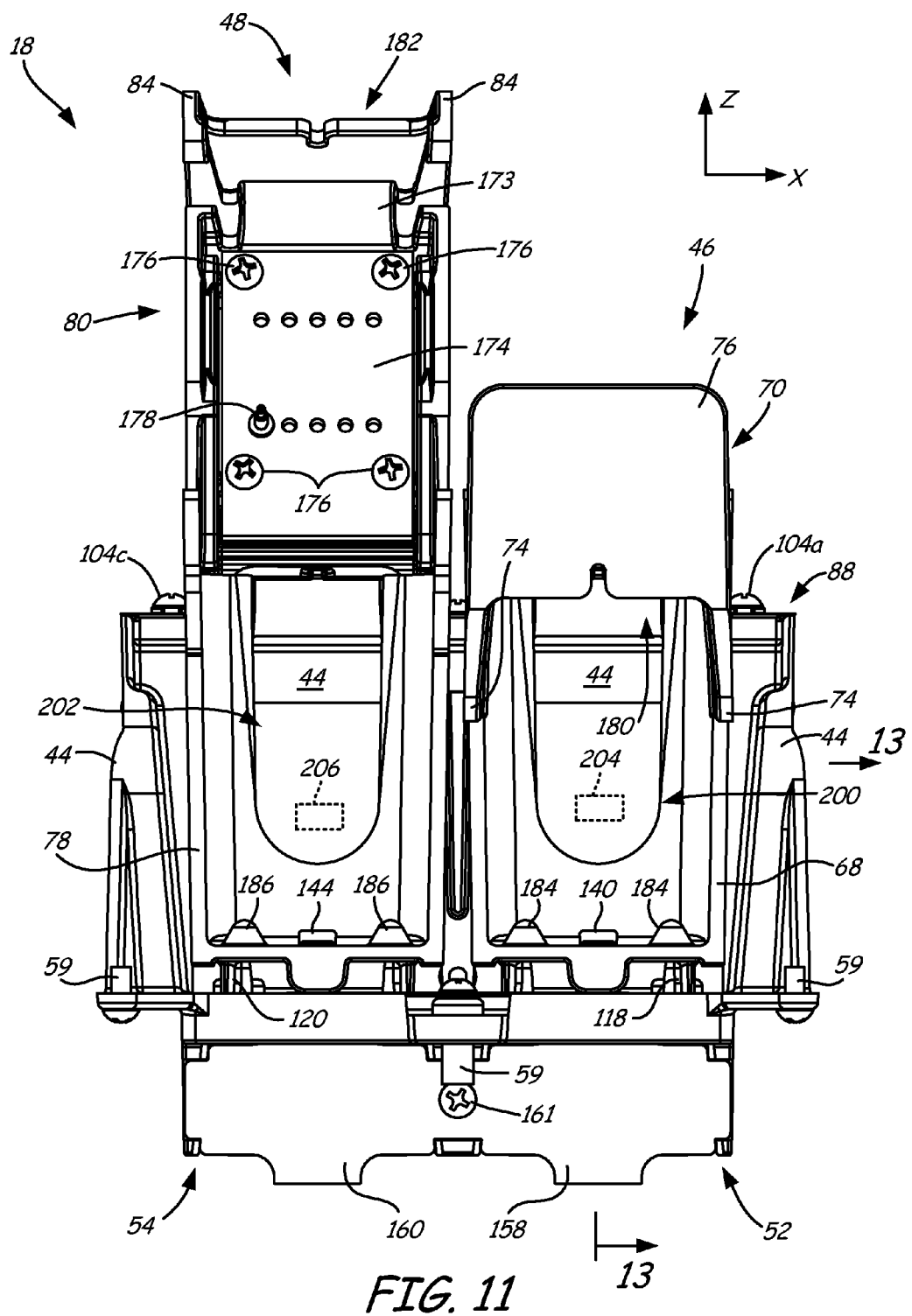
FIG. 11 is a front view of the carriage.
Figure 12:
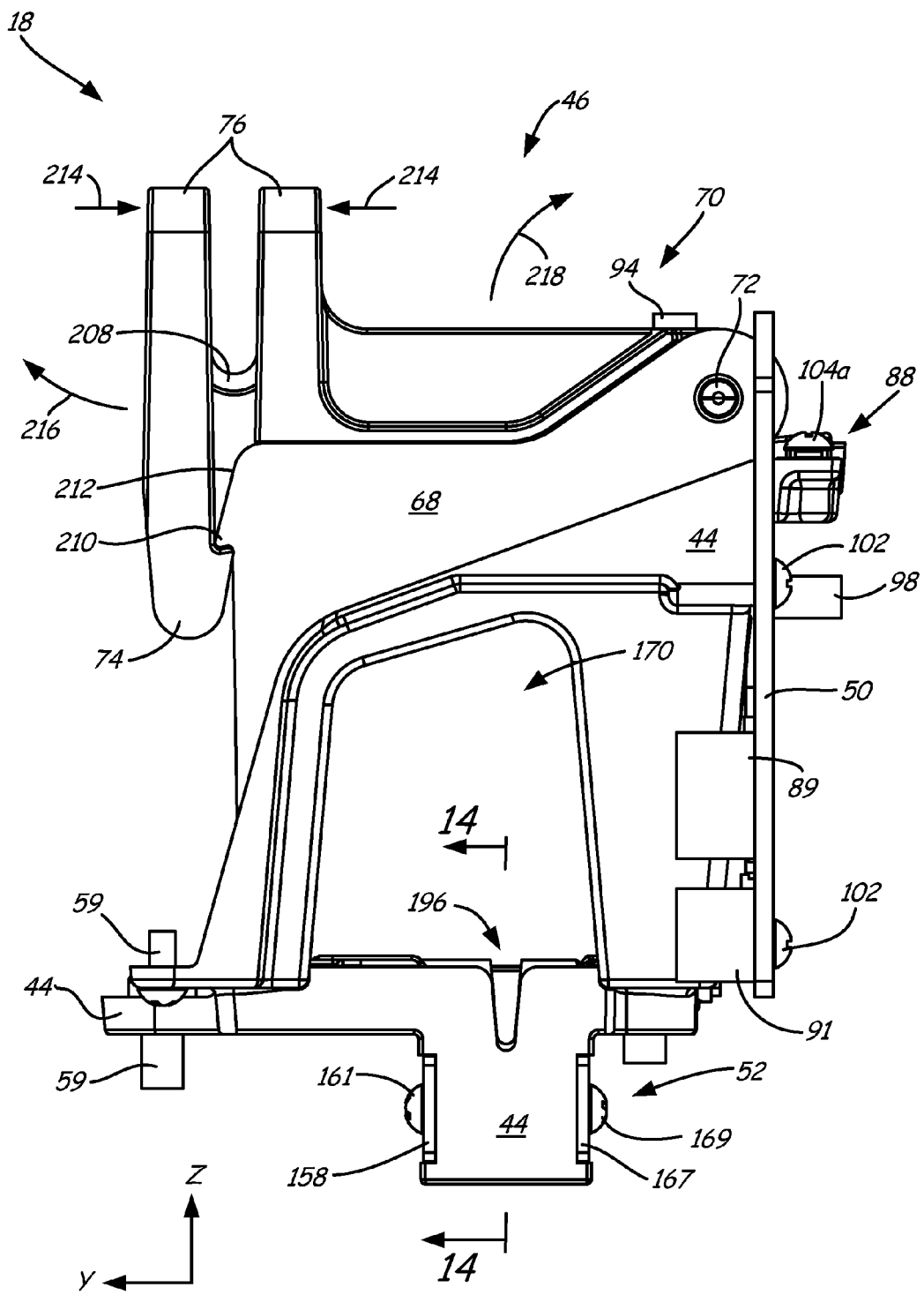
FIG. 12 is a side view of a receptacle of the carriage, illustrating an operation of a lid of the receptacle.

FIGS. 10-12 illustrate carriage frame 44 and receptacles 46 and 48, with print heads 36 and 42, control board 50, and cooling units 56 and 58 omitted. As shown in FIG. 10, base portion 68 of receptacle 46 has dimensions that are configured to receive and retain the rear portion of cartridge assembly 60. Similarly, base portion 78 of receptacle 48 has dimensions that are configured to receive and retain the rear portion of cartridge assembly 64.

Base portions 68 and 78 include vent openings 170 and 172, which are openings through the lateral walls of base portions 68 and 78. The outside vent openings 170 and 172 allow air from cooling units 56 and 58 (shown above in FIGS. 2, 3, 5, and 8) to be directed toward print heads 36 and 42, respectively. The inside vent openings 170 and 172, which face each other, are included to allow base portions 68 and 78 to be identical, thereby allowing a single base portion to be manufactured for use as base portions 68 and 78.

Lid 80 is depicted in FIG. 10 in an open state. As shown, lid 80 also includes bridge member 173, which connects the parallel tabs of pinch actuator 86. Bridge member 173 is configured to bias when pinch actuator 86 is squeezed, thereby allowing latch clamps 84 to disconnect from base portion 78.

Lid 80 also includes circuit board 174, which is secured to the inside surface of lid 80 with screws 176 or other similar fasteners. Circuit board 174 is a printed circuit board or other similar device coupled to electrical interface 96 (shown in FIGS. 2-4 and 9), and includes electrical contact 178. As discussed below, electrical contact 178 is configured to interface with print head 42 when print head 42 is inserted into base portion 78 with lid 80 closed. This allows electrical power and communication to be relayed to and between print head 42 and control board 50 (via circuit board 174, electrical interface 96, and electrical contact 178). As discussed below, lid 70 includes a similar arrangement for relaying electrical power and communication to and between print head 36 and control board 50. In alternative embodiments, circuit board 174 and the corresponding circuit board of lid 70 may be replaced with different types of electrical circuits, such as one or more flexible circuits. In these embodiments, the flexible circuits may directly connect between control board 50 and lids 70 and 80 (i.e., electrical interfaces 94 and 96 may be omitted).

Lids 70 and 80 also include recessed lips 180 and 182, where recessed lip 180 is disposed between latch clamps 74 and recessed lip 182 is disposed between latch clamps 84. Recessed lips 180 and 182 have geometries configured to mate with cartridge assemblies 60 and 64 when print heads 36 and 42 are inserted in base portions 68 and 70, as illustrated above in FIGS. 2, 3, and 8.

Base portions 68 and 78 may each include one or more alignment features configured engage with reciprocating alignment features of print heads 36 and 42. For example, base portion 68 includes alignment cones 184, and base portion 78 includes alignment cones 186. Alignment cones 184 and 186 upward protrusions that engage with reciprocating slots in print heads 36 and 42 (not shown in FIG. 10 or 11) for providing three-point alignments. Base portion 68 also includes slot 188, through which screw 140 may extend to secure lower flexure 124 (shown in FIGS. 5-7) to base portion 68. Similarly, base portion 78 also includes slot 190, through which screw 144 may extend to secure lower flexure 124 to base portion 78.

When lids 70 and 80 are closed, print heads 36 and 42 are pressed downward into base portions 68 and 78 to fully engage alignment cones 184 an 186. This secures print heads 36 and 42 within receptacles 68 and 78 and prevents horizontal and vertical movement of print heads 36 and 42 relative to receptacles 68 and 78, respectively (as well as preventing roll, pitch, and yaw movements). In alternative embodiments, print heads 36 and 42 may include alignment cones and base portions 68 and 78 may include the reciprocating slots.

As further shown in FIG. 10, base portion 68 includes a pair of floor openings 192 and base portion 78 includes a pair of floor openings 194 (only a single floor opening 192 and a single floor opening 194 are fully visible in FIG. 10). Floor openings 192 and 194 are aligned with openings 154 and 156 of carriage frame 44 (shown in FIG. 7). Floor openings 192 and 194 provide access points for inserting screws or other fasteners into openings 154 and 156 to secure carriage frame 44 to gantry 16 (shown above in FIG. 1) after supporting receptacles 46 from carriage frame 44 with upper flexure 88 and lower flexure 124. This reduces the time and effort required to secure carriage 18 to gantry 16 by allowing carriage 18 to be assembled prior to being mounted to gantry 16.

Base portions 68 and 78 also include floor gaps 196 and 198, which are top-down openings in the floors of base portions 68 and 78. Lower extensions 118 and 120 are accessible from above through floor gaps 196 and 198. As such, the voice coils (not shown) of voice coil mechanisms 52 and 54 may be inserted into lower extensions 118 and 120 through floor gaps 196 and 198 to mount the voice coils in lower extensions 118 and 120.

As shown in FIG. 11, base portions 68 and 78 also include rear wall openings 200 and 202, which are U"-shaped openings configured to mate with print heads 36 and 42 (rear wall opening 202 is partially visible in FIG. 10). As discussed below, control board 50 (shown above in FIGS. 2-5, 8, and 9) also includes encoder sensors 204 and 206 (illustrated with broken lines in FIG. 11) located adjacent to, and accessible through, rear wall openings 200 and 202, respectively. Examples of suitable sensors for encoder sensors 204 and 206 include rotary hall sensors (e.g., 2D hall sensors) and the like.

FIG. 12 is a side view of receptacle 46, illustrating the locking engagement between base portion 68 and lid 70 of receptacle 46. As discussed above, in the shown embodiment, receptacles 46 and 48 are identical to each other. As such, the following side view discussion of receptacle 46 is also applicable to receptacle 48.

As shown in FIG. 12, lid 70 includes bridge member 208, which connects the parallel tabs of pinch actuator 76. Bridge member 208 is configured to bias when pinch actuator 76 is squeezed, thereby allowing latch clamps 74 to disconnect from base portion 68. As further shown, the front side of base portion 68 includes a pair of latch hooks 210 and beveled surfaces 212 (only a single latch hook 210 and beveled surface 212 are shown in FIG. 12). Latch hooks 210 are the features of base portion 68 that latch clamps 74 of lid 70 engage with to lock lid 70 to base portion 68.

A user may open lid 70 by squeezing pinch actuator 76, as illustrated by arrows 214. This biases latch clamps 74 in the direction of arrow 216 due to bridge member 208, where the biasing releases latch clamps 74 from latch hooks 212. The release of latch clamps 74 unlocks lid 70 from base portion 68, which allows lid 70 to be opened by pivoting around hinge connection 72, as illustrated by arrow 218.

After print head 36 is inserted or otherwise loaded into base portion 68, the user may then close lid 70, by pivoting lid 70 around hinge connection 72 in a direction that is opposite of arrow 218. When latch clamps 74 of lid 70 reaches beveled surfaces 212, the increasing slopes of beveled surfaces 212 in a direction along the y-axis increasingly bias latch clamps 74 in the direction of arrow 216 (in a similar manner to squeezing pinch actuator 76). Upon passing below beveled surfaces 212, latch clamps 74 snap lock with latch hooks 210, thereby locking lid 70 closed against base portion 68.

When closed and locked with latch clamps 74 and latch hooks 210, receptacle 46 securely locks and retains print head 36 in a manner that prevents print head 36 from moving relative to receptacle 46 in any direction. As discussed above, this arrangement is suitable for preventing unintentional horizontal and vertical shifting, as well as preventing roll, pitch, and yaw movements.

Figure 13:
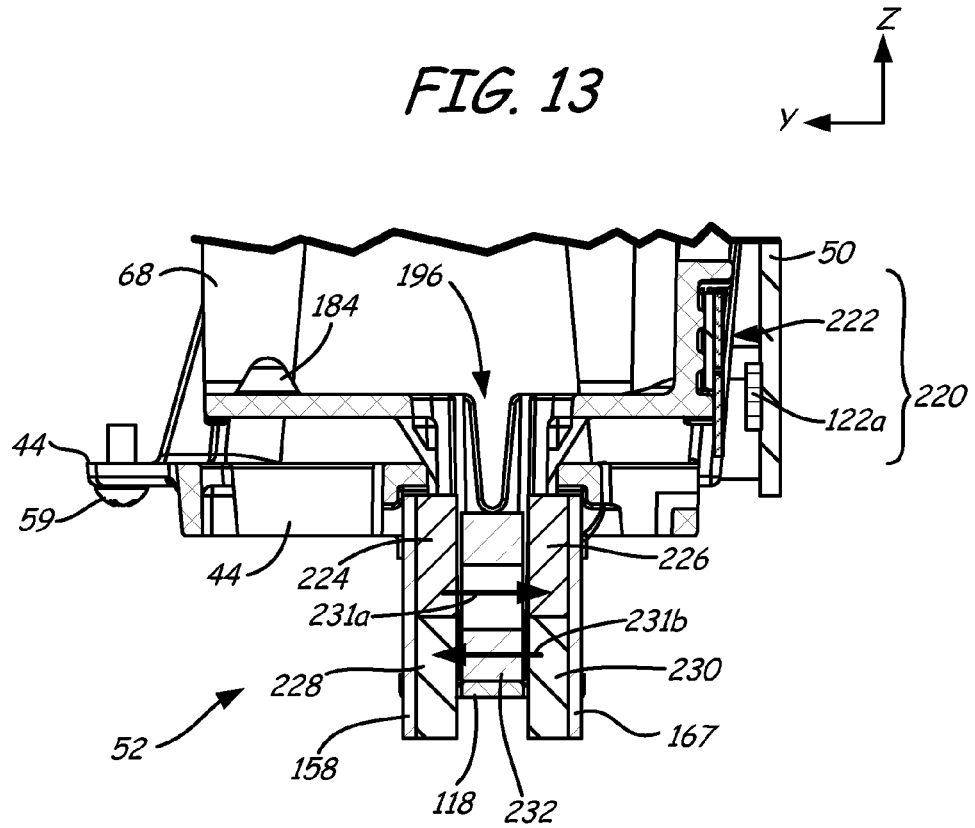
FIG. 13 is a sectional view of Section 13-13 taken in FIG. 11, illustrating one of the voice coil mechanisms.

FIG. 13 is a sectional view of Section 13-13 taken in FIG. 11, which illustrates voice coil mechanism 52 and optical encoder assembly 220. As shown, carriage 18 includes optical encoder assembly 220, which is a reflective optical encoder for receptacle 46 that detects the upward and downward movements of base portion 68. Carriage 18 also includes a second optical encoder assembly (not shown), which is a reflective optical encoder for receptacle 48 that detects the upward and downward movements of base portion 78. As such, optical encoder assembly 220 measures the vertical positions of receptacle 46 and print head 36, and the second optical encoder assembly measures the vertical positions of receptacle 48 and print head 42.

Examples of suitable optical encoder assemblies for optical encoder assembly 220 and the second optical encoder assembly include those disclosed in Batchelder, U.S. Provisional Patent Application No. 61/312,737, entitled "Incremental Optical Encoder", and which is incorporated by reference in its entirety to the extent that it does not conflict with the present disclosure. Optical sensor assembly 220 includes sensor array 122a and sensor target 222. As discussed above, sensor array 122a is retained on the front surface of control board 50, and includes knife-edge electronics for operating optical sensor assembly 220 (e.g., light emitters, photoreceptors, and processors).

Sensor target 222 is a panel secured to the rear side of base portion 68. In the shown embodiment, sensor target 222 includes a reflective or light-colored surface (e.g., reflective sheet metal, silicon minor, and the like) and a non-reflective or dark surface or opening, where the reflective surface is located either above or below the non-reflective surface or opening. In either arrangement, the position of receptacle 46 along the vertical z-axis may be determined based on the locations of the surfaces of sensor target 222 relative to sensor array 122a.

The second optical encoder assembly for receptacle 48 may function in the same manner as optical encoder assembly 220. As discussed above, sensor array 122b (shown in FIG. 5) is retained on the front surface of control board 50, and includes knife-edge electronics for operating the second optical sensor assembly (e.g., light emitters, photoreceptors, and processors). The second optical encoder assembly also includes a sensor target (not shown) secured to the rear side of base portion 78. The position of receptacle 48 along the vertical z-axis may thereby be determined based on the locations of the surfaces of the sensor target relative to sensor array 122b.

As further shown in FIG. 13, voice coil mechanism 52 includes upper magnets 224 and 226, and lower magnets 228 and 230, which are two sets of magnets disposed between front plate 158 and rear plate 167. Upper magnet 224 and lower magnet 228 may be secured to front plate 158 such that upper magnet 224 is located vertically above lower magnet 228, and upper magnet 226 and lower magnet 230 may be secured to rear plate 167 such that upper magnet 226 is located vertically above lower magnet 230.

Upper magnets 224 and 226 are oriented to generate an upper magnetic field with field lines in a first direction (e.g., in the direction of arrow 231a), and which may close through rear plate 167. Lower magnets 228 and 230 are oriented to generate a lower magnetic field with field lines oriented in a second direction (e.g., in the direction of arrow 231b) that are opposite in polarity from the upper magnetic field, and which may close through front plate 158. Upper magnets 224 and 226 and lower magnets 228 and 230 may alternatively be positioned in their reciprocating orientations, such that the upper magnetic field extends in the direction of arrow 231b and the lower magnetic field extends in the direction of arrow 231a.

As shown, upper magnets 224 and 226 face each other, and lower magnets 228 and 230 face each other. In the shown embodiment, front plate 158, rear plate 167, upper magnets 204 and 206, and lower magnets 208 and 210 are retained by carriage frame 44 and do not move with receptacle 46. Voice coil mechanism 52 also includes voice coil 232, which is a coil of wire or other coiled assembly that is secured to and supported by lower extension 118 of receptacle 46. This allows receptacle 46 to move with voice coil 232 relative to carriage frame 44.

Figure 14:
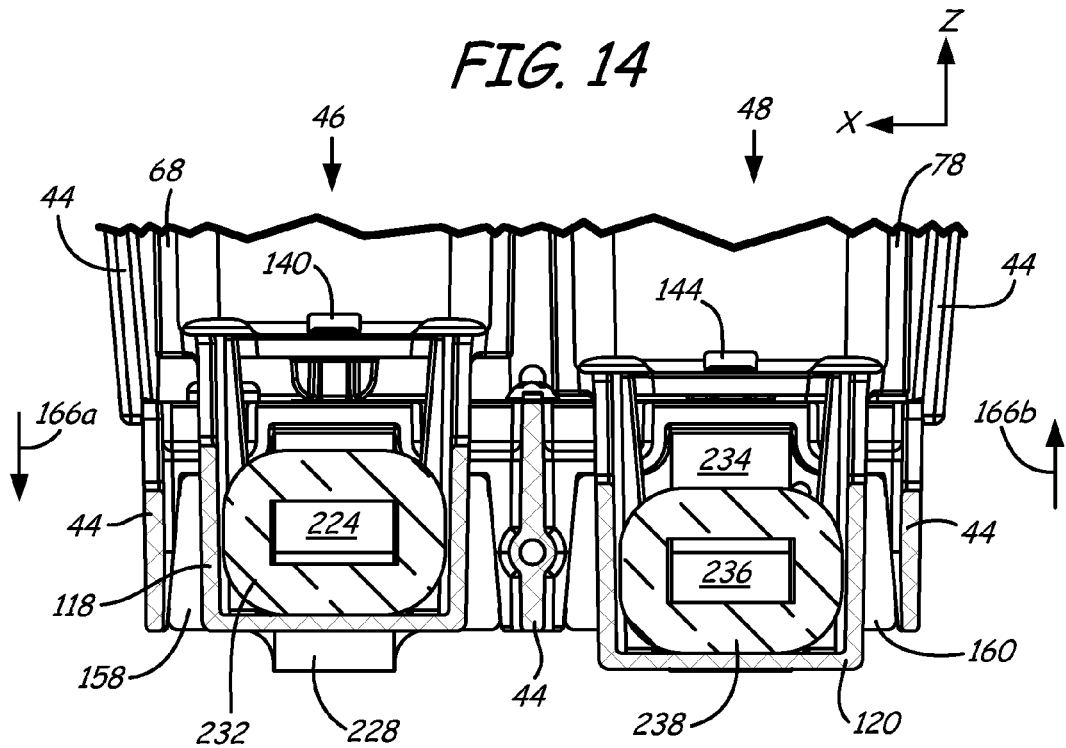
FIG. 14 is a sectional view of Section 14-14 taken in FIG. 12, further illustrating the voice coil mechanisms.

FIG. 14 is a sectional view of Section 14-14 taken in FIG. 12. As shown in FIG. 14, voice coil mechanism 54 includes upper magnet 234, lower magnet 236, and rear magnets (not shown) corresponding to magnets 226 and 230 (shown in FIG. 13), which are disposed between front plate 160 and rear plate 168 (shown above in FIG. 9). As such, in the shown embodiment, front plate 160, rear plate 168, upper magnet 234, lower magnet 236, and the respective rear magnets are retained by carriage frame 44 and do not move with receptacle 48. Voice coil mechanism 54 includes voice coil 238, which is a second coil of wire or other coiled assembly that is secured to and supported by lower extension 120 of receptacle 48, thereby allowing receptacle 48 to move with voice coil 238 relative to carriage frame 44.

In the shown embodiment, voice coil mechanisms 52 and 54 may function as voice coil actuators, where receptacle 48 is illustrated in FIG. 14 at a lowered vertical elevation relative to receptacle 46 (corresponding to the view shown above in FIG. 8). Accordingly, with respect to voice coil mechanism 52, receptacle 46 (and print head 36) may be toggled upward or downward by inducing an electrical current through voice coil 232, where the upward or downward direction depends on the rotational direction of the electrical current that passes through voice coil 232. In particular, the direction of movement is dictated by the force applied to voice coil 232, which is generally at a right angle to the rotational direction of the electrical current induced through voice coil 232 and to the generated magnetic fields.

For example, if an electrical current is passed in a first rotational direction around voice coil 232, the magnetic fields generated by upper magnets 224 and 226 and lower magnets 228 and 230 force voice coil 232 upward relative to carriage frame 44. Because voice coil 232 is secured to lower extension 118 of receptacle 46, the upward force on voice coil 232 correspondingly forces receptacle 46 and print head 36 to move upward relative to carriage frame 44. Alternatively, if an electrical current is passed in a second and opposite rotational direction around voice coil 232, the magnetic fields generated by upper magnets 224 and 226 and lower magnets 228 and 230 force voice coil 232 downward, thereby moving receptacle 46 and print head 36 downward relative to carriage frame 44.

Voice coil mechanism 54 may function in the same manner as voice coil mechanism 52 to move receptacle 48 and print head 42 upward and downward relative to carriage frame 44 based on electrical currents induced through voice coil 238. The use of voice coils 232 and 238 in this manner provide fine-positioning control of the vertical movements for receptacles 46 and 48, independently of each other. As discussed above, the fine-positioning control is desirable to maintain proper vertical registration of print heads 36 and 42.

Moreover, voice coil mechanisms 52 and 54 may be have additional utilities beyond toggling print heads 36 and 42 between lowered, active states and raised, passive states. For example, in some embodiments, voice coil mechanisms 52 and 54 may each be used to compensate for potential backlash in the coarse, z-axis positioner of the gantry for platen 14 (shown in FIG. 1). Such positioner backlash may occur due to frictional resistance in the mechanical mating features of the gantry for platen 14.

Additionally, voice coil mechanisms 52 and 54 may used in applications in which print heads 36 and 42 may require rapid vertical accelerations, such as when reaching ends of tool paths. For example, when print head 36 reaches an end of a tool path and the extrusion is halted, voice coil mechanism 52 may rapidly toggle print head 36 upward (e.g., at about 3 g-forces) to break off the string of extruded material that may otherwise trail after the tip of print head 36. Voice coil mechanism 54 may function in a similar manner.

In alternative embodiments, the components of voice coil mechanisms 52 and 54 that are retained by lower extensions 118 and 120 may vary. For example, in one embodiment, front plate 158, rear plate 167, upper magnets 224 and 226, and lower magnets 228 and 230 may be retained by lower extension 118, thereby allowing these components to move with receptacle 46. In this embodiment, voice coil 232 may then be retained by carriage frame 44. A similar arrangement may be used for voice coil mechanism 54 as well. In additional alternative embodiments, one or both of voice coil mechanisms 52 and 54 may includes ferrofluids or other similar compositions having small-scale ferromagnetic or ferrimagnetic particles suspended in carrier fluids (e.g., water and organic solvents).

Referring to the above-discussed toggling example (see FIGS. 8 and 9), after a given layer of support structure 26 is completed, controller 28 may direct voice coil mechanism 54 to raise receptacle 48 and print head 42 upward along the vertical z-axis from lowered elevation 164. To accomplish this, controller 28 may direct carriage 18 (through control board 50) to induce an electrical current through voice coil 238 in a first rotational direction. The magnetic fields around voice coil 238 force voice coil 238 and receptacle 48 (and print head 42) upward, as illustrated by arrow 166b.

Flexure segment 108 of upper flexure 88 and arms 128b and 128d of lower flexure 124 accordingly flex upward along with receptacle 48 and print head 42 to reach un-flexed and level states. The engagements between base portions 68 and 78 with carriage frame 44 may also define upper and lower hard stops (i.e., physical stopping points) at raised elevation 162 and lowered elevation 164. For example, base portion 68 (and/or lower extension 118) may be raised upward until contacting a downward-facing member of carriage frame 44 corresponding to raised elevation 162, and may be lowered downward until contacting an upward-facing member of carriage frame 44 corresponding to lower elevation 164.

Similarly, base portion 78 (and/or lower extension 120) may be raised upward until contacting a downward-facing member of carriage frame 44 corresponding to raised elevation 162, and may be lowered downward until contacting an upward-facing member of carriage frame 44 corresponding to lower elevation 164. Thus, these hard stop locations may correspond to prevent further vertical movement of either print head 36 or 42 above raised elevation 162 or below lowered elevation 164. Accordingly, when the upper hard stop for base portion 78 is reached, control board 50 may hold the intensity of the electrical current through voice coil 238. This braces base portion 78 against the upper hard stop, and maintains the intended elevation (e.g., raised elevation 162).

Additionally, the second optical encoder assembly (having sensor array 222b, shown in FIG. 5) for receptacle 48 may measure the vertical position of receptacle 48 and print head 42. This is in comparison to a servo-motor based mechanism, in which receptacle 48 would be servoed to a particular vertical position (rather than being moved to a hard stop, followed by an encoder measurement). The measured vertical position may be used for a variety of functions, such as for maintaining registration and for maintaining constant elevations along the vertical z-axis by servoing voice coil mechanism 54 with the measured signals from the second optical encoder assembly.

Controller 28 may also direct voice coil mechanism 52 to lower receptacle 46 and print head 36 downward along the vertical z-axis from raised elevation 162. In particular, controller 28 may direct carriage 18 (through control board 50) to induce an electrical current through voice coil 232 in a first rotational direction. The magnetic fields around voice coil 232 force voice coil 232 and receptacle 46 (and print head 36) downward, as illustrated by arrow 166a.

Flexure segment 106 of upper flexure 88 and arms 128a and 128c of lower flexure 124 accordingly flex downward along with receptacle 46 and print head 36. When the lower hard stop for base portion 68 is reached, optical control board 50 may hold the intensity of the current through voice coil 232. This braces base portion 68 against the lower hard stop, and maintains the intended elevation (e.g., lowered elevation 164). Additionally, optical encoder assembly 220 may measure the vertical position of receptacle 46 and print head. The measured vertical position may also be used for a variety of functions, such as for maintaining registration and for maintaining constant elevations along the vertical z-axis by servoing voice coil mechanism 52 with the measured signals from the second optical encoder assembly.

After a given layer(s) of 3D part 24 is completed, controller 28 may then direct voice coil mechanism 52 to raise receptacle 46 and print head 36 upward along the vertical z-axis from lowered elevation 164. To accomplish this, controller 28 may direct carriage 18 (through control board 50) to induce an electrical current through voice coil 232 in a second rotational direction that is opposite of the first rotational direction of the electrical current previously applied to voice coil 232. The magnetic fields around voice coil 232 accordingly force voice coil 212 and receptacle 46 (and print head 36) upward.

Flexure segment 106 of upper flexure 88 and arms 128a and 128c of lower flexure 124 accordingly flex upward along with receptacle 46 and print head 36 to reach un-flexed and level states. When the upper hard stop for base portion 68 is reached, control board 50 may hold the intensity of the electrical current through voice coil 232. This braces base portion 68 against the upper hard stop, and maintains the intended elevation (e.g., raised elevation 162). Additionally, optical encoder assembly 220 may measure the vertical position of receptacle 46 and print head 36.

Correspondingly, controller 28 may also direct voice coil mechanism 54 to lower receptacle 48 and print head 42 downward along the vertical z-axis from raised elevation 162. In particular, controller 28 may direct carriage 18 (through control board 50) to induce a current through voice coil 238 in a second rotational direction that is opposite of the first rotational direction of the electrical current previously applied to voice coil 238. The magnetic fields around voice coil 238 accordingly force voice coil 238 and receptacle 48 (and print head 42) downward.

Flexure segment 108 of upper flexure 88 and arms 128b and 128d of lower flexure 124 accordingly flex downward along with receptacle 48 and print head 42. When the lower hard stop for base portion 78 is reached, control board 50 may hold the intensity of the electrical current through voice coil 238. This braces base portion 68 against the lower hard stop, and maintains the intended elevation (e.g., lowered elevation 164). Additionally, the second optical encoder assembly may measure the vertical position of receptacle 48 and print head 42.

Due to their independent operations, voice coil mechanisms 52 and 54 may raise and lower receptacles 46 and 48 at the same time in a reciprocating manner, if desired. This reduces the time required to toggle print heads 36 and 42 between build runs. Furthermore, the combination of voice coil mechanisms 52 and 54, along with upper flexure 88 and lower flexure 124 provide precise control of vertical movement for receptacles 46 and 48, while also preventing unintentional horizontal movement of receptacles 46 and 48 (and print heads 36 and 42) relative to carriage frame 44. This allows system 10 to build 3D part 24 and support structure 26 with high-resolution features, while also allowing print heads 36 and 42 to be readily removed and replaced with new print heads 36 and 42.

Figure 15:
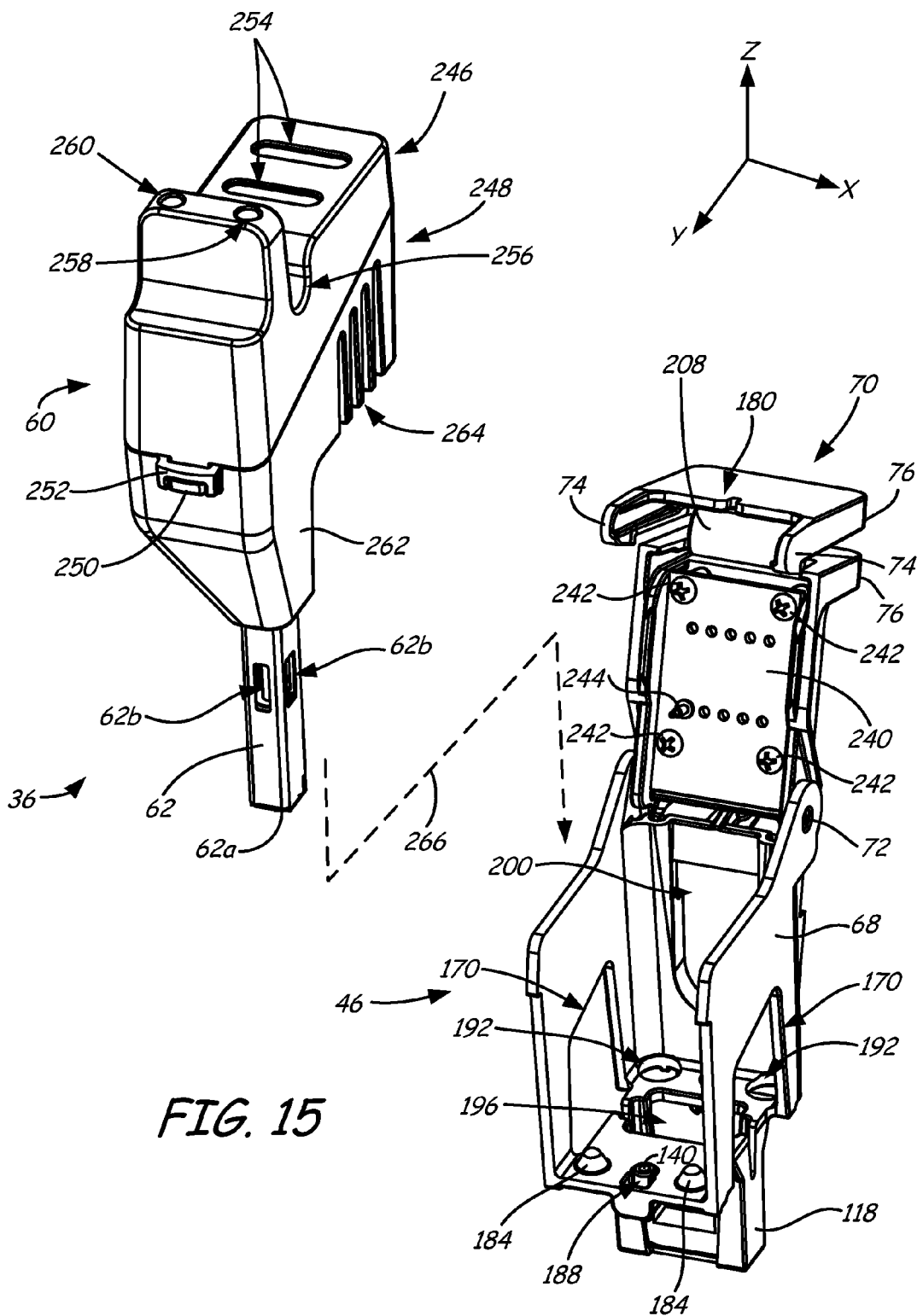
FIG. 15 is a front, top perspective view of one of the print heads positioned above a receptacle of the carriage, illustrating a process for loading or inserting the print head into the receptacle.

FIG. 15 illustrates a process for inserting or otherwise loading print head 36 into receptacle 46, which may also be applied to print head 42 and receptacle 48. As shown, lid 70 includes circuit board 240 secured to the inside surface of lid 70 with screws 242 or other similar fasteners. Circuit board 240 is a printed circuit board or other similar device coupled to electrical interface 94 (shown in FIGS. 2-4 and 9), and includes electrical contact 244. Electrical contact 244 is configured to interface with print head 36 when print head 36 is inserted into base portion 68 with lid 70 closed. This allows electrical power and communication to be relayed to and between print head 36 and control board 50 (via circuit board 240, electrical interface 94, and electrical contact 244) in the same manner as for circuit board 174 (shown in FIGS. 10 and 11). As mentioned above, in alternative embodiments, circuit board 240 may be replaced with different types of electrical circuits, such as one or more flexible circuits. In these embodiments, the flexible circuit may directly connect between control board 50 and lid 70 (i.e., electrical interface 94 may be omitted).

As further shown in FIG. 15, cartridge assembly 60 of print head 36 includes housing cover 246 and housing body 248, each of which may be molded or cast from one or more metallic and/or plastic materials. Housing cover 246 is secured to housing body 248 with latch 250, which is engaged with clip 252 of housing body 248 for assembling print head 36. Housing cover 248 includes electrical ports 254, indentation 256, and guide tube ports 258 and 260.

Electrical ports 254 are openings through housing cover 246 that provide access to a circuit board within cartridge assembly 60 (not shown in FIG. 15). When lid 70 of receptacle 46 is closed, electrical contact 244 inserts through one of electrical ports 254 to engage the circuit board of print head 36. This arrangement relays electrical power and communication to and between circuit board 240 and print head 36.

In the shown embodiment, electrical ports 254 are arranged to provide access to multiple electrical contacts (e.g., electrical contact 242), and to accommodate circuit boards (e.g., circuit board 240) having multiple electrical contacts. In an alternative embodiment, housing cover 246 may include a single electrical ports 254 configured to receive electrical contact 244.

Indentation 256 is a downward-facing indentation of housing cover 226 that accommodates the geometry of recessed lip 180 of lid 70 when print head 36 is retained by receptacle 46. For example, recessed lip 180 maybe inserted into indentation 256 when lid 70 is closed, which assists in securing print head 36 to receptacle 46.

Guide tube ports 258 and 260 are openings through housing cover 226 that provide access for guide tubes of part or support materials. For example, guide tube port 258 may receive guide tube 34 (shown in FIG. 1), which extends through guide tube port 258, thereby aligning guide tube 34 with liquefier tube assembly 62 along the vertical z-axis.

In the shown embodiment, guide tube port 260 is an unused opening for print head 36, which allows a single design for housing cover 246 to be used for both minor image print heads 36 and 42. Accordingly, for print head 42, guide tube 40 may extend through guide tube port 260, and guide tube port 258 may be an unused opening. In alternative embodiments, the unused guide tube ports (e.g., guide tube port 260 for print head 36) may be omitted.

Housing body 248 is configured to rest on the floor of base portion 68, and includes overhang feature 262 and vent 264. Overhang feature 262 has a downward converging geometry, and is the portion of cartridge assembly 60 that liquefier pump assembly 62 extends downward from when print head 36 is mounted in receptacle 46.

As shown above (see e.g., FIGS. 2 and 8), overhang feature 262 and the corresponding overhang feature of print head 42 have downward converging geometries that are mirror images of each other. This reduces the risk of inserting the incorrect print head into a given receptacle. Accordingly, in comparison to the housing covers (e.g., housing cover 246), housing body 248 and the corresponding housing body of print head 42 are mirror images of each other. Vent 264 is a sidewall vent through housing body 248 that allows air flow from cooling unit 56 and vent opening 170 to enter print head 36.

Print head 36 may be inserted or otherwise loaded into receptacle 46 by sliding cartridge assembly 60 into base portion 68 (e.g., as indicated by arrow 266) until the rear portion of cartridge assembly 60 rests within base portion 68. During the insertion, alignment cones 184 are inserted into the bottom reciprocating slots of housing body 248 (not shown in FIG. 15) to provide a three-point alignment between print head 36 and base portion 68. When cartridge assembly 60 is inserted within base portion 68, overhang feature 262 and liquefier pump assembly 62 extend downward (e.g., as shown above in FIGS. 2, 3, 5, and 8). Additionally, when cartridge assembly 60 is inserted within base portion 68, vent 264 is aligned with vent opening 170 in the lateral wall of base portion 68. As mentioned above, this alignment allows cooling unit 56 (shown above in FIGS. 2, 5, and 8) to direct air flow through vent opening 170 and into print head 36 via vent 264.

After print head 36 is inserted into base portion 68, lid 70 may then be closed against base portion 68, as discussed above. When lid 70 is closed, electrical contact 244 engages one of electrical ports 254 of print head 36. This arrangement relays electrical power and communication to and between circuit board 240 and print head 36. Additionally, when lid 70 is closed and locked to base portion 68, the rear portion of cartridge assembly 60 is secured within receptacle 46 with the three-point alignment, thereby preventing lateral or vertical movement of print head 36 relative to receptacle 46 (or roll, pitch, and yaw movements).

Receptacles 46 and 48, having the lid and base portion engagements, are examples of suitable receptacles for use with carriage frame 44 to retain print heads 36 and 42 with snap-fit mechanisms. In alternative embodiments, carriage 18 may include a variety of different receptacles having snap-fit mechanisms for retaining print heads 36 and 42 in a manner that prevents movement of print heads 36 and 42 relative to their respective receptacles.

For example, base portion 68 of receptacle 46 may include a snap-fit engagement in which print head 36 may be inserted into base portion 68 and snap fitted (e.g., with a biasing spring from the floor of base portion 68). In this embodiment, lid 70 may be omitted, and print head 36 may be retained by base portion 68 alone with the snap-fit engagement, which prevents print head 36 from moving relative to base portion 68 (e.g., with alignment cones 184). Electrical connections may then be made directly between control board 50 and print head 36.

As shown in FIG. 16, housing body 248 also includes bottom surface 268, alignment slots 270 and 272, screw slot 274, and rear pocket 276, where rear pocket 276 is a U-shaped portion of housing body 248 that is configured to extend into the U-shaped, rear wall opening 200 of base portion 68 (shown above in FIGS. 11 and 15). Bottom surface 268 is the surface that rests on the floor of base portion 68 (shown in FIGS. 2-5 and 7-15). Alignment slots 270 and 272 are the reciprocating slots that engage with alignment cones 184 (shown in FIGS. 10, 11, and 15) to create the three-point alignment between print head 36 and base portion 68. Screw slot 274 is a slot configured to receive the tip of screw 140 when screw 140 extends through opening 188 (shown above in FIGS. 10, 11, 14, and 15). This prevents screw 140 from interfering with the three-point alignment when print head 36 is inserted into base portion 68.

The three-point alignment desirably fixes the position of print head 36 relative to base portion 68 with respect to the x-y-z coordinates, in addition to the roll, pitch, and yaw orientations. For example, the contact between bottom surface 268 and the floor of base portion 68 may fix the pitch orientation, the engagement between alignment slot 270 (an elongated slot) and one of alignment cones 184 may fix the roll and yaw orientations, and the engagement between alignment slot 272 and the other alignment cone 184 may fix the x-y-z coordinates.

As shown in FIG. 17, print head 36 also includes motor 278, where motor 278 is fully encased within housing cover 246 and housing body 248. Motor 278 includes motor body 280, mounting plate 282, and gear 284, where mounting plate 282 is a metallic or plastic plate secured to motor body 280 with screws 286 or other similar fasteners. Mounting plate 282 is configured to be inserted in mounting slots 288 of housing body 248, thereby securing motor 278 to cartridge assembly 60 when housing cover 246 and housing body 248 are secured together. Housing body 248 also includes mounting slots 289, where mounting slots 288 and 289 are rib-based members of housing body 248.

As further shown, liquefier pump assembly 62 is partially encased within housing cover 246 and housing body 248, and extends downward out of overhang feature 262, as discussed above. Liquefier pump assembly 62 includes drive mechanism 290, backbone assembly 292, liquefier assembly 294, and drive block 295, where liquefier pump 294 is encased by backbone assembly 292, and drive mechanism 290 and drive block 295 are retained by backbone assembly 292 at an upstream location relative to liquefier assembly 294.

Motor body 280 is the drive component of motor 278 that receives electrical power from the circuit board of print head 36 (not shown) via electrical cables (not shown) for generating rotational power. Gear 284 is a rotatable component that is axial connected to motor body 280 to receive the generated rotational power. Gear 284 correspondingly engages drive mechanism 290 to feed successive portions of the part material filament through drive block 295 and liquefier assembly 294.

Backbone assembly 292 and liquefier assembly 294 are the portions of liquefier pump assembly 62 that extend downward from overhang feature 262. Backbone assembly 292 is mountable to housing body 248 via mounting slots 289, thereby securing backbone assembly 292 to cartridge assembly 60 when housing cover 246 and housing body 248 are secured together. Drive mechanism 290 is retained by backbone assembly 292 within overhang feature 262, and motor 278 with gear 284 is disposed above and engaged with drive mechanism 290. Motor body 280 is accordingly mounted in the rear portion of cartridge 60 (when housing cover 246 and housing body 248 are secured together) with mounting plate 282, such that gear 274 extends above overhang feature 262 for engagement with drive mechanism 290.

FIGS. 18 and 19 illustrate additional components of cartridge 60. As shown in FIG. 18, housing cover 246 includes circuit board 296 secured to the inside surface of housing cover 246 with screws 298 or other similar fasteners. Circuit board 296 is a printed circuit board or other similar device that engages with electrical contact 244 of circuit board 240 (shown above in FIG. 15) through electrical ports 254 when lid 70 is closed against base portion 68. Circuit board 296 is configured to relay electrical power and communications to and between liquefier pump assembly 62 and motor 278 (shown above in FIG. 17) with the use of electrical cables (not shown).

As shown in FIG. 19, housing body 248 also includes outlet opening 300. Outlet opening 300 is the opening in overhanging portion 262 though which backbone assembly 292 and liquefier assembly 294 of liquefier pump assembly 62 (shown above in FIG. 17) extend. Outlet opening 300 desirably provides a snug fit with backbone assembly 292 to prevent liquefier pump assembly 62 from moving relative to housing body 248.

Housing body 248 may also additional components for retaining the electrical cables and/or guide tube 34 (shown above in FIG. 1). For example, housing body 248 may include a V-shaped feature (not shown) defining a notch to hold and direct guide tube 34 from guide tube port 258 (shown above in FIGS. 15 and 17) to liquefier pump assembly 62. In particular, guide tube 34 may rest within the notch of the V-shaped feature, which prevents guide tube 34 from moving around within cartridge assembly 60 during use in system 10 (shown in FIG. 1). Additionally, the electrical cables (not shown) interconnecting circuit board 256 and liquefier pump assembly 62 may be retained on either lateral side of the notch. This prevents the electrical cables from moving around within cartridge assembly 60 during use in system 10, and reduces the risk of the electrical cables from getting caught by the moving components of liquefier pump assembly 62 (e.g., drive mechanism 290).

As shown in FIG. 20, motor 278 also includes thrust bearings 302 and magnet 304, and gear 284 includes threaded surface 306. Thrust bearings 302 are disposed between mounting plate 282 and a shoulder of gear 284. During operation, the rotation of gear 284 may apply an axial thrust load in the direction of arrow 308 depending on the rotational direction of gear 284. Thrust bearings 302 are positioned to absorb the axial thrust loads applied to gear 284, which reduce the risk of damage to motor body 280 during operation.

Magnet 304 is a rotatable magnet located on the opposing end of motor body 280 from gear 284, and is also axially connected to motor body 280 to rotate with gear 284. When motor 278 is mounted in housing body 248, magnet 304 is positioned in rear pocket 276. As discussed above, when print head 36 is mounted in receptacle 46, rear pocket 276 extends into rear wall opening 200 (shown above in FIGS. 11 and 15), thereby positioning magnet 304 in close proximity to encoder sensor 204 (shown in FIG. 11) regardless of the vertical toggle elevation of print head 36.

Encoder sensor 204 is a first component of an encoder assembly configured to measure the rotation of gear 284. Magnet 304 is a second component of the encoder assembly, where encoder sensor 204 is capable of measuring the rotational angle of magnet 304 as magnet 304 rotates with gear 284. This arrangement allows the rotational rate and direction of gear 284 to be monitored, which corresponds to the rate at which the part material filament is fed through liquefier pump assembly 62. As mentioned above, encoder sensor 204 is connected control board 50 (shown above in FIGS. 2-5, 8 and 9) for communicating with controller 28 (shown above in FIG. 1).

FIGS. 21-25 further illustrate liquefier pump assembly 62 in use with guide tube 34. In the shown embodiment, liquefier pump assemblies 62 and 66 are mirror images of each other. As such, the following discussion of the various subcomponents of liquefier pump assembly 62 may also apply to liquefier pump assembly 66, which may be engaged with guide tube 40 for extruding the support material from the support material filament.

Figure 21:
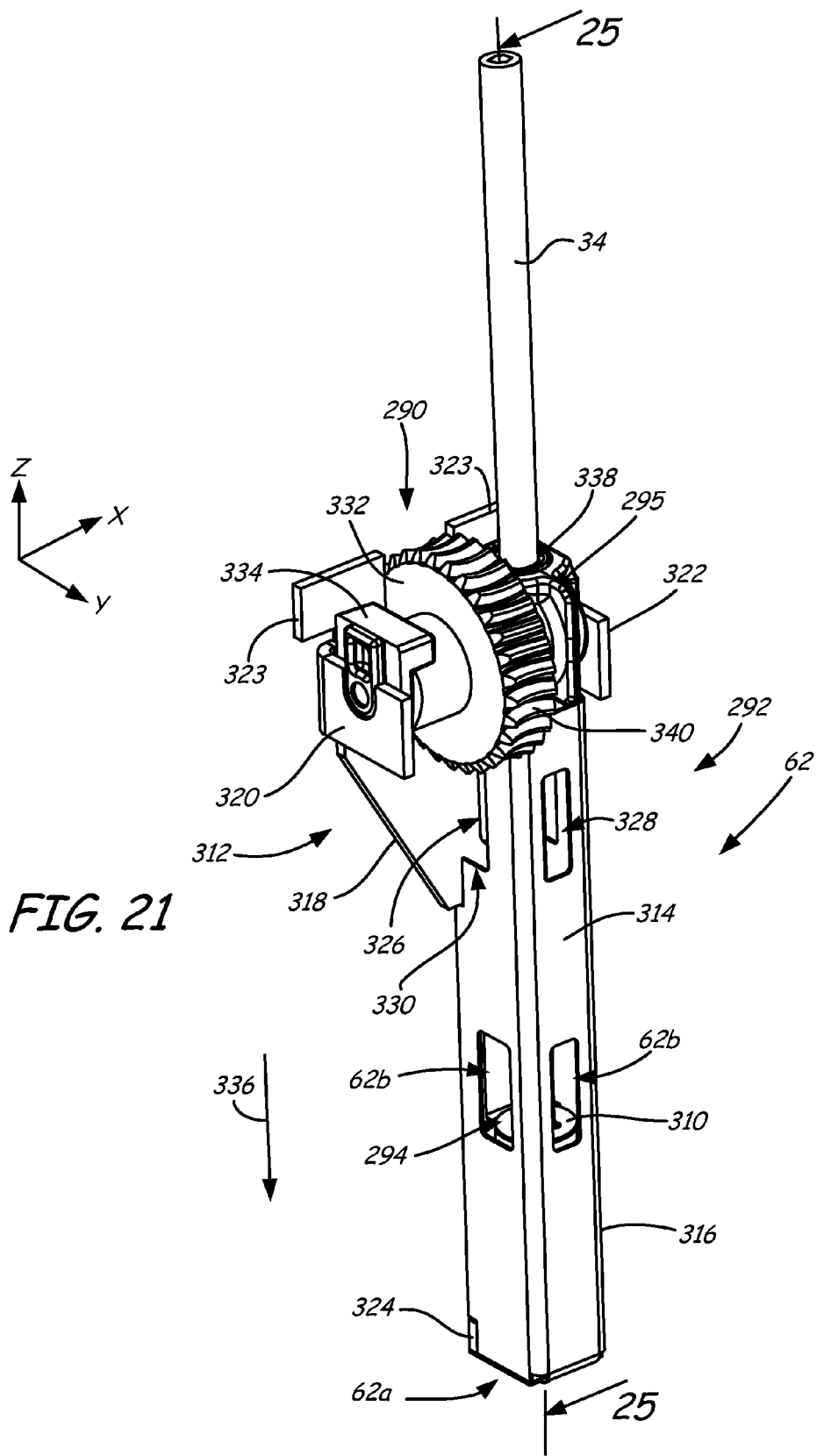
FIG. 21 is a front, top perspective view of a liquefier pump assembly of the print head.

As shown in FIG. 21 and as mentioned above, liquefier pump assembly 62 includes drive mechanism 290, backbone assembly 292, liquefier assembly 294, and drive block 295, where liquefier assembly 294 includes liquefier 310. Backbone assembly 292 is a structure component of liquefier pump assembly 64 and includes backbone plate 312 and heat shield 314.

Backbone plate 312 is a first metallic member (e.g., a steel stamped plate) that is shaped to be secured to heat shield 314 and to retain drive mechanism 290. As shown, backbone plate 312 includes shaft portion 316 (extending along the back side of heat shield 314, best shown below in FIG. 22), angled shield 318, retention arms 320 and 322, and tabs 323. Shaft portion 316 extends along the vertical z-axis between angle shield 318 and tip end 62a, and is secured (e.g., welded) to heat shield 314. For example, shaft portion 316 includes a pair of tabs 324 adjacent to tip end 62a (only a single tab 324 is shown in FIG. 21), which are suitable for aligning and bracing heat shield 314 with shaft portion 316 for welding heat shield 314 and shaft portion 316 together.

Angled shield 318 has a downward converging surface that corresponds to the downward converging geometry of overhang feature 262 (shown above in FIGS. 15-17, and 19) providing a mating fit between angled shield 318 and overhang feature 262 when liquefier pump assembly 62 is mounted in housing body 248 (shown above in FIGS. 15-17, and 19). Angled shield 318 may also function as a heat shield to restrict the air flow from vent 264 (shown above in FIGS. 15-17 and 19) to a pathway within heat shield 314 and shaft portion 316, as discussed below. Retention arms 320 and 322 are laterally-extending arms from angle shield 318 that provide suitable locations for supporting drive mechanism 290 and drive block 295 upstream from liquefier assembly 294. Tabs 323 are the components of backbone assembly 292 that are configured to be inserted into mounting slots 289 of housing body 248 (shown above in FIG. 17) for mounting backbone assembly to housing body 248.

Heat shield 314 is second metallic member (e.g., a steel stamped plate) that is secured to shaft portion 316, as mentioned above. This defines a central conduit along the vertical z-axis through which liquefier assembly 294 extends.

Figure 25:
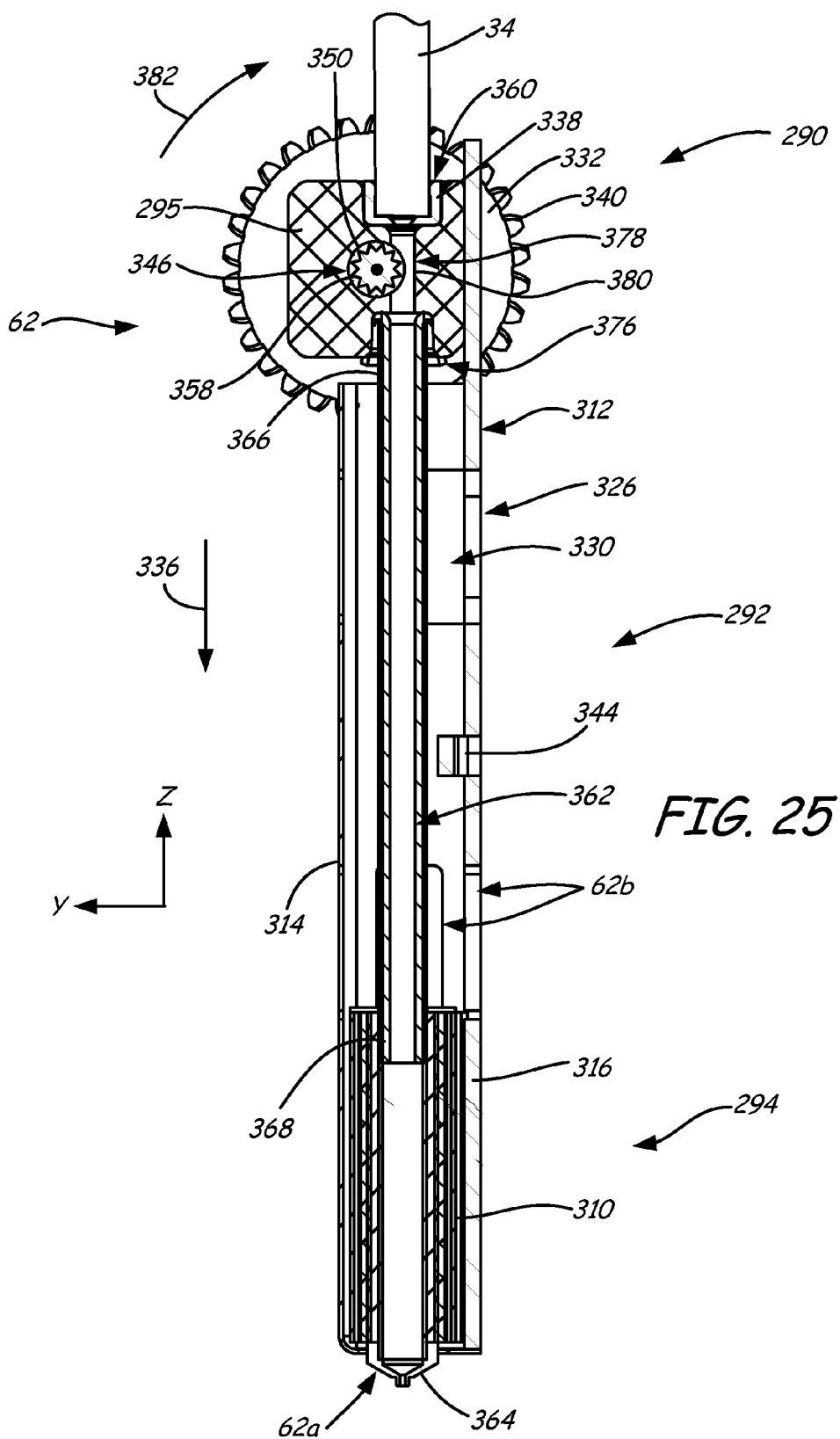
FIG. 25 is a sectional view of Section 25-25 taken in FIG. 21, further illustrating the liquefier pump assembly.

As further shown, backbone plate 312 also includes inlet vent 326 (best shown in FIG. 22), heat shield 314 also includes inlet vent 328, and the engagement between heat shield 314 and angled shield 318 define inlet vent 330 (best shown in FIG. 25). Inlet vents 326, 328, and 330 allow the air flow from cooling unit 56 (shown above in FIGS. 2, 3, 5, and 8) that is directed through cartridge 60 (e.g., shown above in FIG. 15) to enter the central conduit between heat shield 314 and shaft portion 316.

Heat shield 314 and shaft portion 316 collectively include vents 62b, which, in the shown embodiment, are rectangular openings in heat shield 314 and shaft portion 316 above liquefier 310 of liquefier assembly 294. The air flow that passes through the central conduit between heat shield 314 and shaft portion 316 thereby exits print head 36 through vents 62b. Directing the air flow through print head 36 in this manner allows the air flow to cool the components within cartridge 60 (e.g., motor 278, shown above in FIGS. 17 and 20). In addition, the air flow also follows the feed path of the part material filament through liquefier pump assembly 62 prior to reaching liquefier 310. This reduces the risk of having the part material filament melting upstream from liquefier 310, which allows the part material filament to provide a viscosity-pump action to extrude the part material from liquefier 310. Otherwise, without the air flow through the central conduit in this manner, the part material filament may undesirably heat up and soften at locations upstream from liquefier 310, which could impair the extrusion properties of liquefier pump assembly 62.

One or more of inlet vents 326, 328, and 330 may also function as inlet openings for the electrical cables (not shown) that interconnect circuit board 296 (shown above in FIG. 18) and liquefier assembly 294. For example, the electrical cables may extend through outlet opening 300 (shown above in FIG. 19), through inlet vent 326, and down through the central conduit to liquefier assembly 310. This arrangement reduces the risk of the electrical cables from getting entangled in drive mechanism 290.

Figure 22:
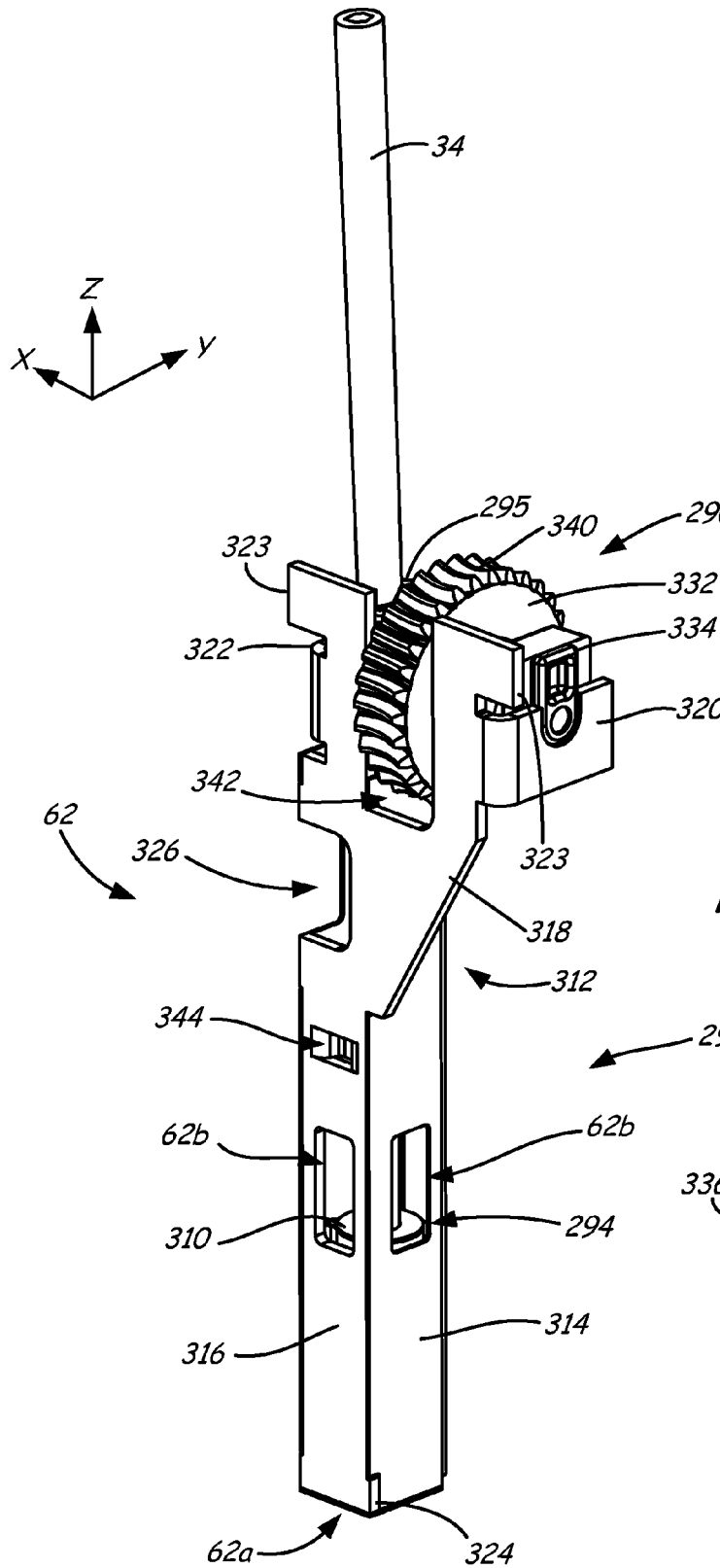
FIG. 22 is a rear, top perspective view of the liquefier pump assembly.

As shown in FIGS. 21 and 22, drive mechanism 290 is configured to feed successive portions of the part material filament (not shown) from guide tube 34 to liquefier assembly 294. Drive mechanism 290 includes capstan gear 332 and bearing block 334, which are located adjacent to drive block 295, upstream from liquefier assembly 294. As used herein, the terms "upstream" and "downstream" are made with reference to a filament feed direction along arrow 336. As further shown, drive block 295 includes seal ring 338. Capstan gear 332, bearing block 334, and drive block 295 may each be molded or cast from one or more metallic and/or plastic materials. Seal ring 338 may be fabricated from one or more plastic and/or rubber-based materials.

Capstan gear 332 is operably supported by bearing block 334 and drive block 295, which are respectively retained by retention arms 320 and 322. Capstan gear 332 includes perimeter teeth 340, which are gear teeth or an otherwise textured surface that extend around the outer perimeter of capstan gear 332, and are the portion of drive mechanism 290 that engage with threaded surface 306 of gear 284 (shown above in FIG. 20).

As discussed below, drive block 295 is the component through which the part material filament passes while being fed from guide tube 34 to liquefier assembly 294. Guide tube 34 engages drive block 295 at seal ring 338, where seal ring 338 is a moisture seal that desirably restricts or prevents moisture from entering guide tube 34 and drive block 295.

As further shown in FIG. 22, backbone plate 314 includes slot 342 through which capstan gear 332 extends. Additionally, shaft portion 316 includes clasp 344, which is a clasp member on the interior side of shaft portion 316 for retaining the electrical cables (not shown) that interconnect circuit board 296 and liquefier assembly 294.

Figure 23:
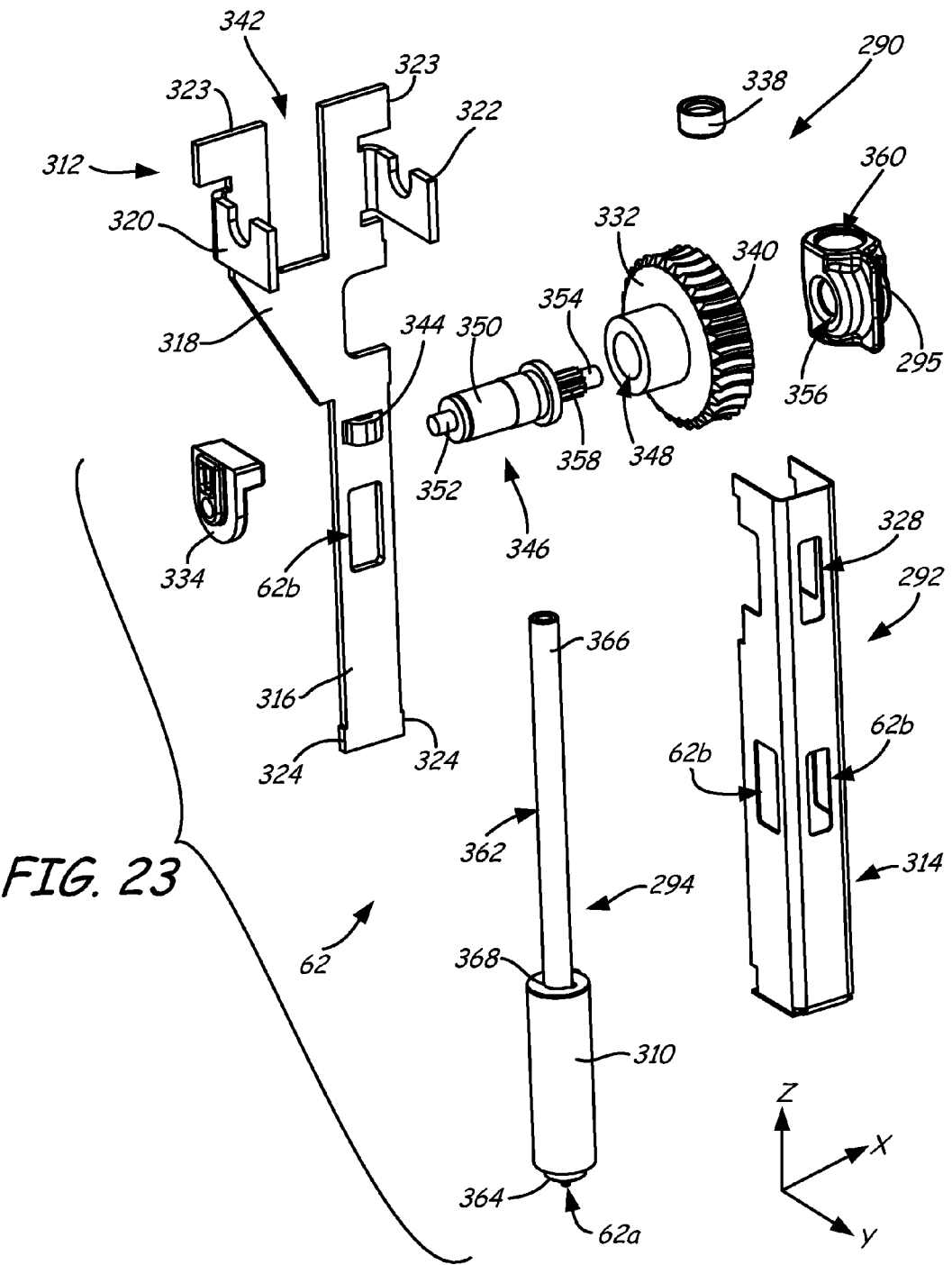
FIG. 23 is an exploded front, top perspective view of the liquefier pump assembly.

As shown in FIG. 23, drive mechanism 290 also includes drive shaft 346, which extends through and is secured to an axial opening of capstan gear 332 (referred to as axial opening 348). In particular, drive shaft 346 includes outer surface 350, which may be secured within axial opening 348, such as with frictional fitting, welding, adhesives, and the like. This allows the rotation of capstan gear 332 to correspondingly rotate drive shaft 346. In an alternative embodiment, capstan gear 332 and drive shaft 346 may be fabricated as a single component in which drive shaft 346 extends from the rotational axis of capstan gear 332.

Drive shaft 346 may also be molded or cast from one or more metallic and/or plastic materials. Drive shaft 346 also includes first end 352 and second end 354, where first end 352 extends into bearing block 334, and second end 354 extends into drive block 295 at lateral opening 356. This mounts drive shaft 346 (and capstan gear 332) to bearing block 334 and drive block 295, which allow drive shaft 346 and capstan gear 332 to freely rotate under the rotational power from gear 284 (shown in FIGS. 17 and 20).

Drive shaft 346 also includes toothed surface 358, which is a toothed or otherwise textured surface that also extends into lateral opening 356 of drive block 295, and is the rotatable surface that engages the part material filament to feed the part material filament downward into liquefier assembly 294. Drive block 295 also includes top opening 360, which is the opening in which guide tube 34 (shown in FIGS. 1, 21, and 22) and seal ring 338 are connected for feeding the part material filament through drive block 295. In particular, seal ring 338 may be inserted into top opening 360, and guide tube 34 may then be inserted into and secured to top opening 360, such as with frictional fitting, adhesives, and the like.

In the shown embodiment, liquefier assembly 294 includes liquefier 310 (as mentioned above), filament tube 362, and extrusion tip 364. Filament tube 362 includes top end 366, which engages a bottom opening of drive block 295 (not shown in FIG. 23) and bottom end 368, which extends into liquefier 310. Examples of suitable liquefier assemblies for liquefier assembly 294 (e.g., liquefier 310, filament tube 362, and extrusion tip 364) include those disclosed in Swanson et al., U.S. patent application Ser. No. 12/888,087, entitled "Liquefier Assembly For Use In Extrusion-Based Additive Manufacturing Systems"; Swanson et al., U.S. patent application Ser. No. 12/888,098, entitled "Method For Building Three-Dimensional Models With Extrusion-Based Additive Manufacturing Systems"; Batchelder et al., U.S. Application Publication No. 2009/0273122; Swanson et al., U.S. Pat. No. 6,004,124; Comb, U.S. Pat. No. 6,547,995; and LaBossiere et al., U.S. Pat. Nos. 7,384,255 and 7,604,470. As discussed in these references, the part material filament may be fed through filament tube 362 into liquefier 310. Liquefier 310 may then melt and extrude the part material from extrusion tip 364 build 3D part 24 (shown in FIG. 1). In some embodiments, extrusion tip 364 is integrally formed with liquefier 310.

Figure 24:
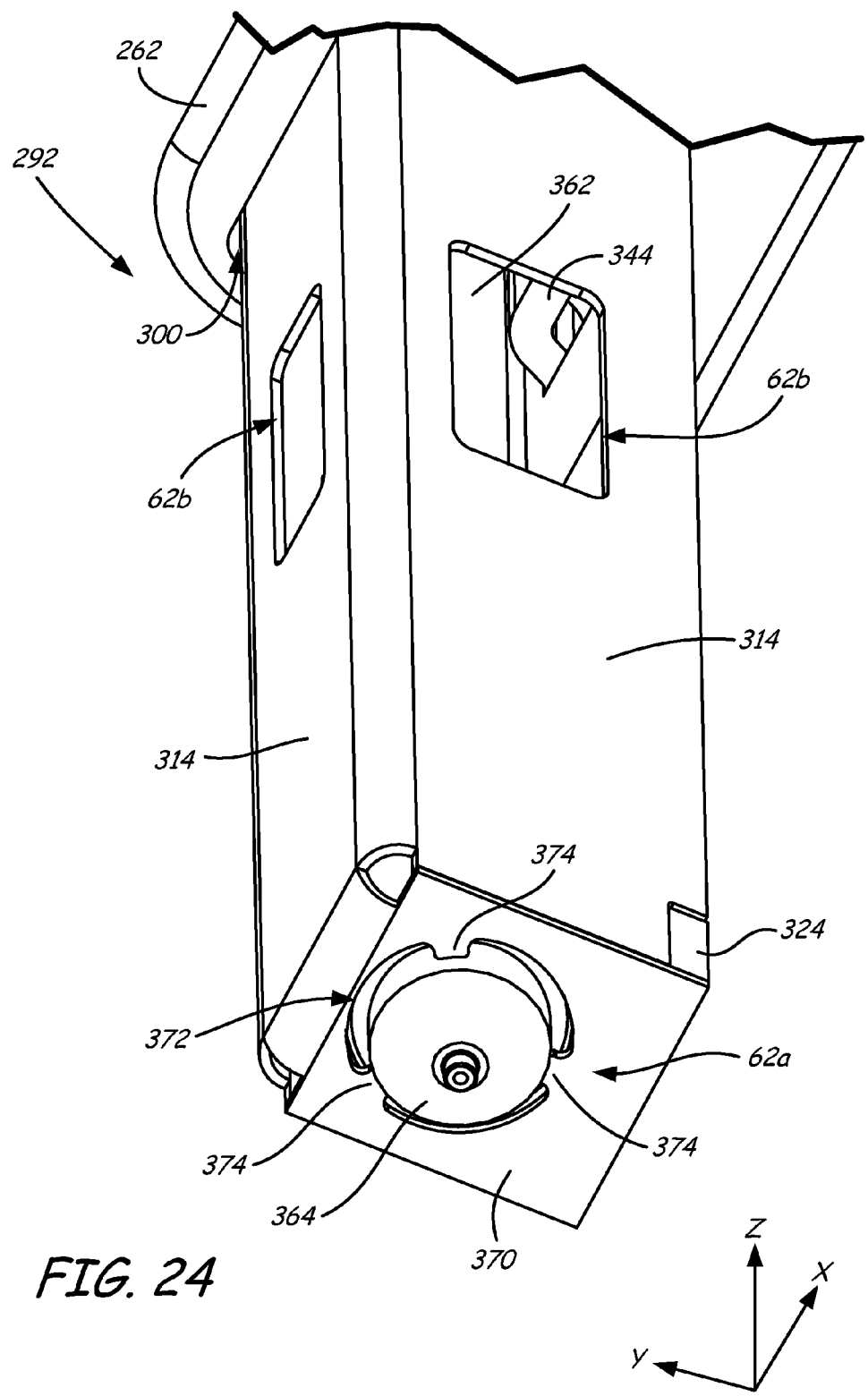
FIG. 24 is a front, bottom perspective view of a tip end of the liquefier pump assembly.

As shown in FIG. 24, heat shield 314 also includes bottom surface 370, which is desirably secured to shaft portion 316 (e.g., welded). Bottom surface 370 includes opening 372 through which extrusion tip 364 extends through. In the shown embodiment, bottom surface 370 includes radial tabs 374, which extend inward into opening 372 and provide suitable locations for securing extrusion tip 374 (e.g., with spot welding). Liquefier 310 (shown above in FIGS. 17 and 21-23) is desirably not directly connected to backbone assembly 292 to reduce heat transfer between liquefier 310 and heat shield 314 and shaft portion 316. As such, securing extrusion tip 364 to bottom surface 370 in this manner prevents liquefier assembly 294 from moving relative to backbone assembly 292.

In addition, this arrangement also reduces heat transfer from extrusion tip 364 to backbone assembly 292 by reducing the contact surface area between extrusion tip 364 and bottom surface 370 to radial tabs 374 (e.g., three small tabs). This allows liquefier 310 to maintain a suitable thermal profile during operation. If extrusion tip 364 were otherwise secured to bottom surface 370 around the entire perimeter of extrusion tip 364, the heat transfer would be higher, thereby requiring liquefier 310 to compensate to account for the thermal loss.

Furthermore, bottom surface 370 may be laminated or otherwise coated with a film of one or more materials having low coefficients of friction, such as fluorinated polymers (e.g., perfluoropolymers). Examples of suitable fluorinated polymers include polytetrafluoroethylenes (PTFE), fluorinated ethylene propylenes, and perfluoroalkoxy polymers. Examples of suitable commercially available fluorinated polymers include PTFE available under the trade designation "TEFLON" from E.I. du Pont de Nemours and Company, Wilmington, Del. The use of the film or coating in this manner prevents or otherwise reduces the part material from sticking to bottom surface 370 during a build run and/or during purge and extrusion tip cleaning steps.

As shown in FIG. 25, drive block 295 also includes bottom opening 376 and channel 378, where bottom opening 376 is the outlet opening of drive block 295 in which top end 366 of filament tube 362 extends into. Channel 378 interconnects top opening 360 and bottom opening 376, and is a pathway extending along the vertical z-axis in which toothed surface 358 of drive shaft 346 extends for engaging the part material filament (not shown).

Channel 378 may have dimensions that accommodate the part material filament without undue friction, while desirably preventing the part material filament from buckling while engaged with toothed surface 358 of drive shaft 346. Accordingly, channel 378 includes a lateral port (not shown) at the intersection with lateral opening 256 (shown above in FIG. 23) through which toothed surface 358 extends. Channel 378 also includes lateral supporting wall 380, which functions as a bracing wall for supporting the part material filament as toothed surface 358 engages the part material filament.

The engagement between guide tube 34, drive block 295, and filament tube 362, along with drive shaft 346 extending through lateral opening 356, provides a self-alignment feature that reduces or prevents the risk of misfeeding the part material filament into liquefier tube 362 and liquefier 310. If drive block 295 were otherwise omitted, a gap would exist between guide tube 34 and filament tube 362 at the location of channel 378. This gap could potentially result in misfeeds of the part material filament from guide tube 34 to filament tube 362, which could result in delays in building 3D part 24. Furthermore, having the leading end of the part material filament extending at least into drive block 295, and even into filament tube 362, further increases the self-alignment feature of liquefier pump assembly 62.

Prior to operation, the part material filament may reside in guide tube 34, and desirably extends at least as far downward into drive block 295 as conduit 378 for engagement with toothed surface 358. This allows drive mechanism 290 to readily feed the part material filament without requiring additional feeding steps.

After print head 36 is inserted into receptacle 46, cooling unit 56 may direct air flow through cartridge assembly 60 and downward into liquefier pump assembly 62. As discussed above, the air flow is directed downward through the central conduit between backbone plate 312 and heat shield 314, and out of the vents (e.g., vents 62b).

Controller 28 may then direct motor 278 to rotate gear 284 (e.g., via control board 50, electrical interfaces 94 and 98, circuit board 240, electrical contact 244, electrical ports 254, circuit board 296, and the respective electrical connections, such as electrical cables). The engagement between threaded surface 306 of gear 284 and toothed perimeter 340 of capstan gear 332 correspondingly rotates capstan gear 332, such as in the direction of arrow 382. The secured connection between outer surface 350 of drive shaft 346 and axial opening 348 of capstan gear 332 correspondingly rotates drive shaft 346 in the rotational direction of arrow 382 at the same angular rate as capstan gear 332. This accordingly rotates toothed surface 358 in the rotational direction of arrow 382 at the same angular rate as capstan gear 332.

The rotation of toothed surface 358 in the rotational direction of arrow 382 causes the teeth of toothed surface 358 to engage with the part material filament within channel 378, where the part material filament is also braced against lateral supporting wall 380. The engaged part material filament is then driven downward into filament tube 362 and liquefier 310, in the direction of arrow 336. Within liquefier 310, the part material filament is melted and extruded out of extrusion tip 364 to build 3D part 24, for example, as disclosed in Swanson et al., U.S. patent application Ser. No. 12/888,087, entitled "Liquefier Assembly For Use In Extrusion-Based Additive Manufacturing Systems"; and Swanson et al., U.S. patent application Ser. No. 12/888,098, entitled "Method For Building Three-Dimensional Models With Extrusion-Based Additive Manufacturing Systems".

The upstream segments of the part material filament provide a viscosity-pump action to extrude the molten part material from extrusion tip 364 based on the feed rate of the part material filament into liquefier 310. The feed rate of the part material filament is correspondingly based on the drive rates of gear 284 of motor 278, capstan gear 332, and drive shaft 346.

When the extrusion run with liquefier pump assembly 62 is completed, controller 28 may direct motor 278 to stop the rotate of gear 284, which correspondingly stops the rotations of capstan gear 332 and drive shaft 346. This halts the feeding of the part material filament into liquefier 310, which correspondingly stops the extrusion of the molten part material from extrusion tip 364.

Receptacle 42 and print head 36 may then be toggled upward with voice coil mechanism 52, and receptacle 48 and print head 42 may be toggled downward with voice coil 54, as discussed above. Controller 28 may then direct print head 42 to extrude the molten support material from liquefier pump assembly 66 in the same manner as discussed above for liquefier pump assembly 62. The extrusion runs and toggling between the lowered, active states and the raised, passive states may then be repeated to build 3D part 24 and support structure 26 in a layer-based manner pursuant to the fused deposition modeling technique.

FIG. 26 is a flow diagram of method 400 for assembling print heads 36 and 42. The following discussion on method 400 is made with reference to print head 36 with the understanding that method 400 may also apply to print head 42. As shown, method 400 includes steps 402-416, and initially involves assembling liquefier pump assembly 62 (step 402). An example of a suitable method for assembling liquefier pump assembly 62 pursuant to step 402 is discussed below. Liquefier pump assembly 62 may then be mounted in housing body 248 of cartridge assembly 60 (step 404). For example, backbone assembly 292 and liquefier assembly 294 may be inserted through opening 300 in housing body 248, tabs 323 may be inserted into mounting slots 289, and angled plate 318 may be supported by overhang feature 262 of housing body 248.

In an alternative embodiment, liquefier pump assembly 62 may be only partially assembled prior to being mounted in housing body 248. For example, in one embodiment, drive mechanism 290 and drive block 295 may be mounted onto retention arms 320 and 322 of backbone assembly 292 after mounting liquefier pump assembly 62 in housing body 248.

Motor 278 may then be mounted in housing body 248 (step 406). As discussed above, mounting plate 282 of motor 278 may be inserted into mounting slots 288 of housing body 248. This also engages threaded surface 306 of gear 284 (of motor 278) with teethed perimeter 340 of capstan gear 332 to allow gear 284 to rotate capstan gear 332 and drive shaft 346. Additionally, mounting motor 278 in housing body 248 positions magnet 304 into rear pocket 276.

Circuit board 296 may also be secured to the inner surface of housing cover 246, such as with screws 298 (step 408). Circuit board 286 may then be electrically connected to motor 278 and liquefier assembly 294, such as with electrical cables (step 410). In alternative embodiments, steps 408 and 410 may be performed prior to or along with each other and any of steps 402, 404, and/or 406.

Guide tube 34 may also be inserted through guide tube port 258 (step 412) and into top opening 360 of drive block 295 to secure guide tube 34 to liquefier pump assembly 62 (step 414). As discussed above, this creates a self-aligning feature and a moisture barrier for feeding successive segments of the part material filament from guide tube 34 to liquefier 310. Additionally, the part material filament is desirably inserted at least as far as channel 378 of drive block 295 to engage with toothed surface 358 of drive shaft 346, which allows the part material filament to be readily used when print head 36 is inserted into receptacle 46. Housing cover 246 may then be secured to housing body 248 (step 416). This provides print head 36, which is then ready for insertion into receptacle 46 for use in system 10, as discussed above.

FIG. 27 is a flow diagram of method 418 for assembling liquefier pump assembly 62, pursuant to step 402 of method 400 (shown above in FIG. 26). As shown in FIG. 27, method 418 includes steps 420-430, and initially involves assembling backbone assembly 292 (step 420). For example, backbone plate 312 and heat shield 314 may be fabricated (e.g., stamped) and welded together with the use of tabs 324.

Liquefier assembly 294 may then be assembled and inserted into backbone assembly 292 (step 422). For example, liquefier assembly 294 may be inserted into backbone assembly 292 such that top end 366 of filament tube 362 is located adjacent to angled plate 318 and liquefier 310 is disposed at tip end 62a. This arrangement also allows extrusion tip 364 to extend through opening 372 of bottom surface 370 (of heat shield 314).

Extrusion tip 364 may then be spot welded or otherwise secured to radial tabs 374 to secure extrusion tip 364 to backbone assembly 292 (step 424). As discussed above, spot welding extrusion tip 364 to radial tabs 374 reduces the contact surface area between extrusion tip 364 and backbone assembly 292 to reduce heat transfer.

Drive shaft 346 may also be inserted into and secured to axial opening 348 of capstan gear 332 (step 426) to allow the rotation of capstan gear 332 to likewise rotate drive shaft 346. Drive shaft 346 may then be inserted into bearing block 334 and drive block 295 (step 428). For example, first end 352 of drive shaft 346 may be inserted into bearing block 334, and second end 354 may be inserted into lateral opening 356 of drive block 295. This rotatably suspends drive shaft 346 (and capstan gear 332) between block 334 and drive block 295. Additionally, this arrangement also positions toothed surface 358 of drive shaft 346 in channel 378 of drive block 295 to engage a part material filament.

Bearing block 334 and drive block 295 may then be respectively mounted and secured to retention arms 320 and 322 (step 430), and seal ring 338 may be inserted into top opening 360 of drive block 295. This step also inserts and secures top end 366 of filament tube 362 into bottom opening 376 of drive block 295, thereby providing the self-aligning feature for the part material filament. In alternative embodiments, one or both of steps 426 and 428 may be performed prior to or along with steps 410, 422, and/or 424. As indicated above in step 402 of method 400, after method 418 is completed, the resulting liquefier pump assembly 62 may then be mounted in housing body 248, pursuant to step 404 of method 400.

As discussed above, after methods 400 and 418 are completed for each of print heads 36 and 42, print heads 36 and 42 may be inserted into and locked with receptacles 46 and 48 of carriage 18 (and thereby providing print head assembly 43). System 10 may then be controlled to extrude and deposit part and support materials from print heads 36 and 42 onto platen 14 to build 3D models (e.g., 3D model 24) and support structures (e.g., support structure 26) in a layer-based manner using the fused deposition modeling technique.

Furthermore, receptacles 46 and 48 themselves are suspended by carriage frame 44 in a manner that allows controlled movement of receptacles 46 and 48 (and print heads 36 and 42) relative to carriage frame 44 along the vertical z-axis via voice coil mechanisms 52 and 54, while also preventing movement of receptacles 46 and 48 (and print heads 36 and 42) relative to carriage frame 44 in the horizontal x-y plane, as well as preventing roll, pitch, and yaw movements. This arrangement allows voice coil mechanisms 52 and 54 to toggle receptacles 46 and 48 (and print heads 36 and 42) between lowed, active states and raised, passive states in a manner provide precise control of vertical movement for receptacles 46 and 48, independently of each other. As such, print head assembly 43 is suitable for building 3D models (e.g., 3D model 24) and support structures (e.g., support structure 26) with high-resolution features, while also allowing multiple print heads (e.g., print heads 36 and 42) to be replacably interchanged.

As mentioned above, suitable part and support materials for use with system 10 and print head assembly 43 include part and support material filaments. Suitable part materials for building 3D model 24 include polymeric and metallic materials. In some embodiments, suitable modeling materials include materials having amorphous properties, such as thermoplastic materials, amorphous metallic materials, and combinations thereof. Examples of suitable thermoplastic materials for the part material filament include acrylonitrile-butadiene-styrene (ABS) copolymers, polycarbonates, polysulfones, polyethersulfones, polyphenylsulfones, polyetherimides, amorphous polyamides, modified variations thereof (e.g., ABS-M30 copolymers), polystyrene, and blends thereof. Examples of suitable amorphous metallic materials include those disclosed in Batchelder, U.S. Patent Application Publication No. 2009/0263582.

Suitable support materials for building support structure 26 include polymeric materials. In some embodiments, suitable support materials include materials having amorphous properties (e.g., thermoplastic materials) and that are desirably removable from the corresponding modeling materials after 3D model 24 and support structure 26 are built. Examples of suitable support materials include water-soluble support materials commercially available under the trade designations "SR10", "SR20", and "SR30" Soluble Supports from Stratasys, Inc., Eden Prairie, Minn.; break-away support materials commercially available under the trade designation "BASS" from Stratasys, Inc., Eden Prairie, Minn., and those disclosed in Crump et al., U.S. Pat. No. 5,503,785; Lombardi et al., U.S. Pat. Nos. 6,070,107 and 6,228,923; Priedeman et al., U.S. Pat. No. 6,790,403; and Hopkins et al., U.S. Patent Application Publication No. 2010/0096072.

In some embodiments, the part and support material filaments may each have a cylindrical or substantially cylindrical geometry, such as those disclosed in Swanson, U.S. Patent Application Publication No. 2010/0283172; Swanson, International Publication No. WO2009/088995; Swanson et al., U.S. Pat. No. 6,923,634; Comb et al., U.S. Pat. No. 7,122,246; and Taatjes et al, U.S. Patent Application Publication Nos. 2010/0096485 and 2010/0096489.

In alternative embodiments, the part and support material filaments may each have a non-cylindrical geometry, such as the ribbon filaments disclosed in Batchelder et al., U.S. patent application Ser. No. 12/612,333, entitled "Non-Cylindrical Filaments for use in Extrusion-Based Digital Manufacturing Systems". In these embodiments, suitable liquefiers for liquefier 310 include those disclosed in Batchelder et al., U.S. patent application Ser. No. 12/612,329, entitled "Ribbon Liquefier for use in Extrusion-Based Digital Manufacturing Systems" and in Swanson et al., U.S. patent application Ser. No. 12/888,087, entitled "Liquefier Assembly For Use In Extrusion-Based Additive Manufacturing Systems".

In additional embodiments, the part and support material filaments may each include topographical surfaces patterns (e.g., tracks) for engaging drive mechanism 290, as disclosed in Batchelder et al., U.S. patent application Ser. No. 12/612,342, entitled "Consumable Materials having Topographical Surface Patterns for use in Extrusion-Based Digital Manufacturing Systems. Furthermore, the part and support material filaments may each include encoded markings, as disclosed in Batchelder et al., U.S. patent application Ser. No. 12/622,042, entitled "Consumable Materials having Encoded Markings for use with Digital Manufacturing Systems and in Batchelder et al., U.S. patent application Ser. No. 12/949,898, entitled "Encoded Consumable Materials and Sensor Assemblies for use in Additive Manufacturing Systems".

Although the present disclosure has been described with reference to preferred embodiments, workers skilled in the art will recognize that changes may be made in form and detail without departing from the spirit and scope of the disclosure.

The invention claimed is:

1. A method for building a three-dimensional part with a fused deposition modeling system having a print head carriage configured to move substantially in a plane, the method comprising:
    loading a print head to a receptacle of the print head carriage, the receptacle being supported from a carriage frame of the print head carriage such that the receptacle is restricted from movement relative to the carriage frame in directions parallel to the plane, but is controllably moveable relative to the carriage frame in directions outside of the plane;
    actuating a snap-fit mechanism to secure the loaded print head to the receptacle to prevent the loaded print head from moving relative to the receptacle;
    moving the print head carriage retaining the secured print head in the plane;
    feeding a material with the secured print head;
    melting the fed material in the secured print head;
    extruding the molten material from the secured print head to form at least a portion of the three-dimensional part;
    controllably moving the receptacle containing the secured print head relative to the carriage frame in at least one direction outside of the plane with a toggle mechanism; and
    removing the print head from the receptacle.

2. The method of claim 1, wherein actuating the snap-fit mechanism to secure the loaded print head to the receptacle comprises closing a receptacle lid against a receptacle base portion to retain the loaded print head in a manner that prevents the print head from moving relative to the receptacle.

3. The method of claim 1, wherein controllably moving the receptacle containing the secured print head relative to the carriage frame in at least one direction outside of the plane the axis comprises a movement along a linear axis that is substantially orthogonal to the plane, or a movement along a pivoting axis outside of the plane.

4. The method of claim 1, and further comprising measuring positions of the receptacle along the axis with an encoder assembly.

5. The method of claim 1, wherein loading the print head to the receptacle comprises aligning the print head with alignment features of the receptacle.

6. The method of claim 1, and further comprising communicating between the secured print head and a control board retained by the carriage frame through an electrical circuit retained by the receptacle.

7. The method of claim 1, and further comprising forcing an air flow through the receptacle and into the secured print head.

8. The method of claim 1, and further comprising:
loading a second print head to a second receptacle of the print head carriage, the second receptacle being supported from the carriage frame; and
actuating a second snap-fit mechanism to secure the loaded second print head to the second receptacle.

9. A method for building a three-dimensional part with a fused deposition modeling system having a print head carriage configured to move substantially in a plane, the method comprising:
inserting at least a portion of a print head into a receptacle base portion of the print head carriage, the receptacle base portion being suspended from a carriage frame of the print head carriage such that the receptacle base portion is restricted from movement relative to the carriage frame in directions parallel to the plane, but is controllably moveable relative to the carriage frame in directions outside of the plane;
closing a receptacle lid against the receptacle base portion to retain the inserted portion of the print head in a manner that prevents the print head from moving relative to the receptacle base portion;
moving the print head carriage with the retained print head along at least one axis of a plane;
depositing a material from the retained print head to form at least a portion of the three-dimensional part; and
controllably moving the receptacle base portion with the closed receptacle lid relative to the print head carriage relative to the carriage frame in at least one direction outside of the plane with a toggle mechanism.

10. The method of claim 9, wherein closing the receptacle lid against the receptacle base portion comprises contacting at least one electrical contact to the print head.

11. The method of claim 10, and further comprising communicating between a circuit board of the receptacle lid and the print head over the at least one electrical contact.

12. The method of claim 9, and further comprising:
feeding a material with the retained print head; and
melting the fed material in the retained print head.

13. The method of claim 9, and further comprising:
opening the closed receptacle lid;
removing the retained print head;
inserting at least a portion of a second print head into the receptacle base portion; and
reclosing the receptacle lid against the receptacle base portion to retain the inserted portion of the second print head in a manner that prevents the second print head from moving relative to the receptacle base portion.

14. The method of claim 9, wherein inserting at least a portion of the print head into the receptacle base portion comprises aligning the portion of the print head with alignment features of the receptacle base portion.

15. A method for building a three-dimensional part with a fused deposition modeling system having a print head carriage configured to move substantially in a horizontal plane, the method comprising:
suspending a receptacle of the print head carriage from a carriage frame of the print head carriage in a manner that prevents movement of the receptacle relative to the carriage frame in directions parallel to the horizontal plane, but allows the receptacle to be controllably moved substantially along a vertical axis;
loading a print head to the receptacle;
securing the loaded print head to the receptacle to prevent the loaded print head from moving relative to the receptacle;
moving the print head carriage in the horizontal plane;
depositing a material from the secured print head to form at least a portion of the three-dimensional part; and
controllably moving the receptacle relative to the carriage frame substantially along the vertical axis with a toggle mechanism.

16. The method of claim 15, and further comprising measuring positions of the receptacle along the vertical axis with an encoder assembly.

17. The method of claim 15, wherein loading the print head to the receptacle comprises aligning the print head with alignment features of the receptacle.

18. The method of claim 15, and further comprising communicating between the print head and a control board retained by the carriage frame.

19. The method of claim 15, and further comprising forcing an air flow through the receptacle and into the secured print head.

20. The method of claim 15, wherein the receptacle is a first receptacle and the print head is a first print head, and wherein the method further comprises:
suspending a second receptacle of the print head carriage from the carriage frame;
loading a second print head to the second receptacle;
moving the second receptacle relative to the carriage frame substantially along the vertical axis independently of moving the first receptacle relative to the carriage frame.

* * * * *